US011985598B2

(12) United States Patent
Gupta et al.

(10) Patent No.: US 11,985,598 B2
(45) Date of Patent: May 14, 2024

(54) TECHNIQUES TO FACILITATE POWER SAVING WHILE MONITORING PAGING AND WAKEUP SIGNALS

(71) Applicant: QUALCOMM Incorporated, San Diego, CA (US)

(72) Inventors: Ashutosh Gupta, Gangapur (IN); Harinath Reddy Patel, Hyderabad (IN); Janga Reddy Alimineti, Hyderabad (IN); Neeraj Panwar, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 285 days.

(21) Appl. No.: 17/457,410

(22) Filed: Dec. 2, 2021

(65) Prior Publication Data

US 2023/0180130 A1   Jun. 8, 2023

(51) Int. Cl.
*H04W 52/02* (2009.01)
*H04W 68/00* (2009.01)
*H04W 72/044* (2023.01)
*H04W 72/23* (2023.01)

(52) U.S. Cl.
CPC ..... *H04W 52/0232* (2013.01); *H04W 68/005* (2013.01); *H04W 72/044* (2013.01); *H04W 72/23* (2023.01)

(58) Field of Classification Search
CPC ......... H04W 52/0232; H04W 52/0235; H04W 68/005; H04W 72/044; H04W 72/23; Y02D 30/70
See application file for complete search history.

(56) References Cited

U.S. PATENT DOCUMENTS

| 11,096,079 | B2* | 8/2021 | Zhang | H04W 52/0229 |
| 2019/0223149 | A1* | 7/2019 | Tseng | H04W 72/0446 |
| 2020/0037396 | A1 | 1/2020 | Islam et al. | |
| 2020/0229092 | A1* | 7/2020 | Wu | H04W 52/0219 |
| 2021/0044394 | A1* | 2/2021 | Beale | H04W 72/54 |

(Continued)

FOREIGN PATENT DOCUMENTS

| CA | 3134681 A1 * | 10/2020 | H04L 1/1671 |
| EP | 3846550 A4 * | 11/2021 | H04L 5/0098 |

(Continued)

OTHER PUBLICATIONS

International Search Report and Written Opinion—PCT/US2022/048737—ISA/EPO—dated Feb. 24, 2023.

*Primary Examiner* — Chi H Pham
*Assistant Examiner* — Vladislav Y Agureyev
(74) *Attorney, Agent, or Firm* — Procopio, Cory, Hargreaves & Savitch LLP

(57) ABSTRACT

Apparatus, methods, and computer-readable media for facilitating power savings while monitoring for paging messages and wakeup signals are disclosed herein. An example method for wireless communication at a UE includes receiving an indication of an active BWP associated with an ON duration of a DRX cycle. The example method also includes monitoring a first bandwidth for a WUS at a WUS occasion of the DRX cycle, the first bandwidth corresponding to a subset of the active BWP. The example method also includes transitioning to an awake state for the ON duration when the WUS is received at the WUS occasion.

30 Claims, 15 Drawing Sheets

(56) References Cited

U.S. PATENT DOCUMENTS

| | | | |
|---|---|---|---|
| 2021/0099954 A1 | 4/2021 | Agiwal et al. | |
| 2021/0120524 A1* | 4/2021 | Palle | H04W 68/005 |
| 2022/0070922 A1* | 3/2022 | Talarico | H04W 74/0808 |
| 2022/0078872 A1* | 3/2022 | Shrestha | H04W 76/30 |
| 2022/0286964 A1* | 9/2022 | Peng | H04W 52/0229 |
| 2023/0037852 A1* | 2/2023 | Islam | H04L 5/0094 |
| 2023/0209464 A1* | 6/2023 | Tsai | H04W 76/27 |
| | | | 370/311 |
| 2024/0031985 A1* | 1/2024 | Agiwal | H04W 68/02 |

FOREIGN PATENT DOCUMENTS

| | | | | |
|---|---|---|---|---|
| EP | 3741073 B1 * | 9/2023 | | H04L 5/001 |
| WO | WO-2019060197 A1 * | 3/2019 | | H04L 5/001 |
| WO | WO-2019192456 A1 * | 10/2019 | | H04L 5/0053 |
| WO | WO-2022000181 A1 * | 1/2022 | | H04W 52/0216 |
| WO | WO-2022031540 A9 * | 3/2022 | | |

* cited by examiner

| PARAMETER | DEFINITION |
|---|---|
| drx-onDurationTimer | the duration at the beginning of a DRX cycle |
| drx-SlotOffset | the delay before starting the *drx-onDurationTimer* |
| drx-InactivityTimer | the duration after the PDCCH occasion in which a PDCCH indicates a new UL or DL transmission for the MAC entity |
| drx-RetransmissionTimerDL | (per DL HARQ process except for the broadcast process) the maximum duration until a DL retransmission is received |
| drx-RetransmissionTimerUL | (per UL HARQ process) the maximum duration until a grant for UL retransmission is received |
| drx-LongCycleStartOffset | the Long DRX cycle and *drx-StartOffset* which defines the subframe where the Long and Short DRX cycle starts |
| drx-ShortCycle (optional) | the Short DRX cycle |
| drx-ShortCycleTimer (optional) | the duration the UE shall follow the Short DRX cycle |
| drx-HARQ-RTT-TimerDL | (per DL HARQ process except for the broadcast process) the minimum duration before a DL assignment for HARQ retransmission is expected by the MAC entity |
| drx-HARQ-RTT-TimerUL | (per UL HARQ process) the minimum duration before a UL HARQ retransmission grant is expected by the MAC entity |
| ps-Wakeup (optional) | the configuration to start associated *drx-onDurationTimer* in case DCP (DCI with CRC scrambled by Power Saving Radio Network Temporary Identifier (PS-RNTI)) is monitored but not detected |
| ps-TransmitOtherPeriodicCSI (optional) | the configuration to report periodic CSI that is not L1-RSRP on PUCCH during the time duration indicated by *drx-onDurationTimer* in case DCP is configured but associated *drx-onDurationTimer* is not started |
| ps-TransmitPeriodicL1-RSRP (optional) | the configuration to transmit periodic CSI that is L1-RSRP on PUCCH during the time duration indicated by *drx-onDurationTimer* in case DCP is configured but associated *drx-onDurationTimer* is not started |

FIG. 9

TECHNIQUES TO FACILITATE POWER SAVING WHILE MONITORING PAGING AND WAKEUP SIGNALS

TECHNICAL FIELD

The present disclosure relates generally to communication systems, and more particularly, to wireless communication utilizing discontinuous reception.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). An example apparatus receives an indication of an active bandwidth part (BWP) associated with an ON duration of a discontinuous reception (DRX) cycle. The example apparatus also monitors a first bandwidth for a wakeup signal (WUS) at a WUS occasion of the DRX cycle, the first bandwidth corresponding to a subset of the active BWP. Additionally, the example apparatus transitions to an awake state for the ON duration when the WUS is received at the WUS occasion.

In another aspect of the disclosure, a method, a computer-readable medium, and an apparatus are provided for wireless communication at a base station. An example apparatus transmits, to a UE, an indication of an active BWP associated with an ON duration of a DRX cycle of the UE. The example apparatus also transmits a WUS to the UE on a first bandwidth at a WUS occasion of the DRX cycle, the first bandwidth corresponding to a subset of the active BWP.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 9 illustrates an example table including parameters and definitions that may be included in DRX configuration information, in accordance with various aspects of the present disclosure.

DETAILED DESCRIPTION

Figure 1:
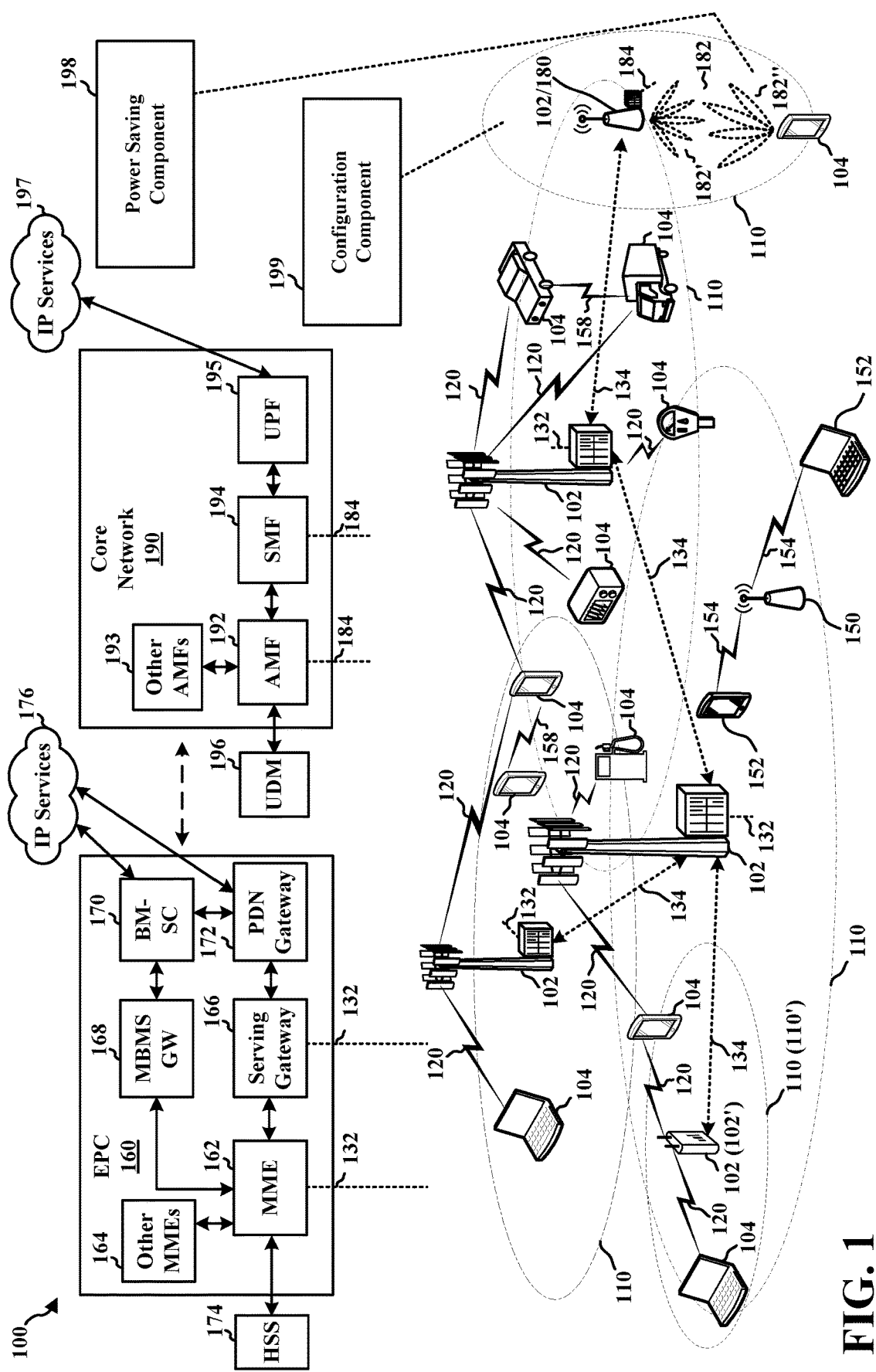
FIG. 1 is a diagram illustrating an example of a wireless communications system and an access network.

In some scenarios, a UE may monitor a communication link continuously for an indication that the UE may receive data. In other scenarios, a UE may operate in a discontinuous reception (DRX) mode. When in the DRX mode, the UE may enter a low power state to conserve power and/or extend battery life, and may periodically wake up to monitor a control channel for signals relating to the UE.

A UE operating in a DRX mode may operate according to a DRX cycle, which may include a DRX ON duration and a DRX OFF duration. A DRX ON duration may be defined as a period of time during which all or most of the radio components utilized by the UE for receiving are activated or powered-on. A DRX OFF duration may be defined as a period of time during which all or most of the radio components utilized by the UE for receiving are deactivated or powered-off. A DRX ON duration and a DRX OFF duration may make up a DRX cycle. In a connected mode DRX (C-DRX) (or connected DRX mode), the UE may maintain an RRC connection with a base station (e.g., operate in an RRC connected state) while powering off certain radio components of the UE for some predetermined period.

In some examples, a DRX ON duration may also be referred to as a period of time during which the UE is "awake" or operating in an "awake state." Thus, a UE that transitions from a DRX OFF duration to a DRX ON duration may be said to "wake up." In some examples, a DRX OFF duration may also be referred to as a period of time during which the UE is "asleep" or operating in a "low power state." Thus, a UE that transitions from a DRX ON duration to a DRX OFF duration (e.g., from an awake state to a low power state) may be said to "go to sleep."

While operating in the awake state (e.g., during the DRX ON duration), the UE monitors a control channel for signaling related to a downlink transmission. However, such control channel monitoring may be resource intensive and may consume battery power because the control channel may use complex signals that include large amounts of information. For example, the UE may wake up, search for signals on the control channel, decode the signals if the signals are found, and determine whether the decoded signals are relevant to the UE. If the decoded signals are not relevant to the UE or if no signal are found on the control channel, then the battery power used to search for, receive, and decode the signals is wasted.

In some examples, to improve battery power conservation, the UE may be configured with a wakeup signal (WUS) occasion before the start of the DRX ON duration. During a WUS occasion, certain radio components of the UE may remain in an idle state and processing of a WUS may be performed by the lower layers of the UE. A WUS occasion may refer to a period during which the UE may receive a WUS indicating to the UE to perform control channel monitoring. For example, if the UE detects a WUS during a WUS occasion, the UE wakes up to monitor the control channel for signals. However, when the UE is unable to detect a WUS during the WUS occasion, the UE skips the subsequent DRX ON duration and returns to the low power state until the next DRX cycle. In this way, the UE wakes up to perform complex control channel signal processing when the control channel includes signals relevant to the UE, thereby conserving battery power and resources of the UE.

When the UE wakes up to monitor for the WUS, the UE may tune to an active bandwidth part (BWP) configured for the UE. The active BWP may be a BWP that the UE becomes active at while in an awake state. However, the WUS may be received in a subset of the active BWP. Thus, it may be appreciated that tuning the RF unit of the UE to the active BWP to monitor for a WUS during a WUS occasion may result in wasted battery usage as the active BWP is associated with a larger bandwidth than a bandwidth associated with the WUS (e.g., a WUS bandwidth). Aspects disclosed herein provide techniques for conserving resources when monitoring for a WUS during a WUS occasion by enabling the RF unit of the UE to tune to the bandwidth associated with the WUS (e.g., the WUS bandwidth) instead of the bandwidth on which the UE is camped (e.g., the active BWP).

In some examples, a UE may be configured to monitor for paging. A paging message may indicate that there is a change in system information, and/or may indicate a public warning system (PWS) notification, such as an Earthquake and Tsunamic Warning System (ETWS) notification or a Commercial Mobile Alert System (CMAS) notification.

A UE may be configured to monitor for paging via paging configuration information. The paging configuration information may indicate information relating to a paging frame and to paging occasions. While the UE may receive a paging message during a paging occasion of a paging frame, the associated information (e.g., the change in the system information and/or the PWS notification) may be received during a subsequent paging frame. That is, for a change or notification in an upcoming cycle, the UE will be paged in a current cycle (or page frame).

When the UE is operating in an RRC connected state and configured with a DRX mode (e.g., a C-DRX mode), the UE may be configured to monitor one paging occasion in every paging frame. For example, as the paging frame may include multiple paging occasions, as long as the UE decodes at least one paging message during the paging frame, the UE may determine whether there is a change in system information and/or a PWS notification.

Aspects disclosed herein provide techniques for improving power savings at the UE when the UE is configured to monitor WUS occasions and at least one paging occasion. For example, disclosed techniques include the UE selecting a paging occasion that overlaps in time or is relatively near in the time-domain to a WUS occasion. In this way, the UE may conserve resources by reducing the number of transitions from the low power state to the awake state to monitor for the WUS occasions and the paging occasion.

Additionally, aspects disclosed herein provide techniques for a UE to further improve power savings by configuring the UE to select the paging occasion that is near a WUS occasion and that is also near the end of the paging frame to monitor for a paging message. In this way, the UE may wake up at each WUS occasion and tune to the WUS bandwidth associated with the WUS to reduce the bandwidth monitored and, thus, improve power savings at the UE. Additionally, for the selected paging occasion (e.g., the WUS occasion that is near a paging occasion and also located near the end of the modification window), the UE may tune to the larger bandwidth between the WUS bandwidth and the paging bandwidth. Thus, the UE wakes up and tunes to the larger bandwidth associated with the paging bandwidth on one occasion while tuning to the smaller bandwidth associated with the WUS bandwidth for the remaining WUS occasions overlapping in time with the modification window.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100 including base stations 102 and 180 and UEs 104. In certain aspects, a device in communication with a base station, such as a UE 104, may be configured to manage one or more aspects of wireless communication by facilitating power savings while monitoring for paging and WUS. For example, the UE 104 may include a power saving component 198 configured to receive an indication of an active bandwidth part (BWP) associated with an ON duration of a discontinuous reception (DRX) cycle. The example power saving component 198 may also be configured to monitor a first bandwidth for a wakeup signal (WUS) at a WUS occasion of the DRX cycle, the first bandwidth corresponding to a subset of the active BWP. The example power saving component 198 may also be configured to transition to an awake state for the ON duration when the WUS is received at the WUS occasion.

In another configuration, a base station, such as the base stations 102 and 180, may be configured to manage or more aspects of wireless communication by facilitating power savings while a UE is monitoring for paging and WUS. For example, the base stations 102/180 may include a configuration component 199 configured to transmit, to a user equipment (UE), an indication of an active BWP associated with an ON duration of a DRX cycle of the UE. The example configuration component 199 may also be configured to transmit a WUS to the UE on a first bandwidth at a WUS occasion of the DRX cycle, the first bandwidth corresponding to a subset of the active BWP.

The aspects presented herein may enable a UE to reduce bandwidth being monitoring for paging and WUS, which may facilitate improving power savings at the UE, for example, by reducing the bandwidth the UE monitors at each WUS occasion and a selected paging occasion.

Although the following description provides examples directed to 5G NR, the concepts described herein may be applicable to other similar areas, such as LTE, LTE-A, CDMA, GSM, and/or other wireless technologies, in which a UE may operate in a C-DRX mode.

The example of the wireless communications system of FIG. 1 (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
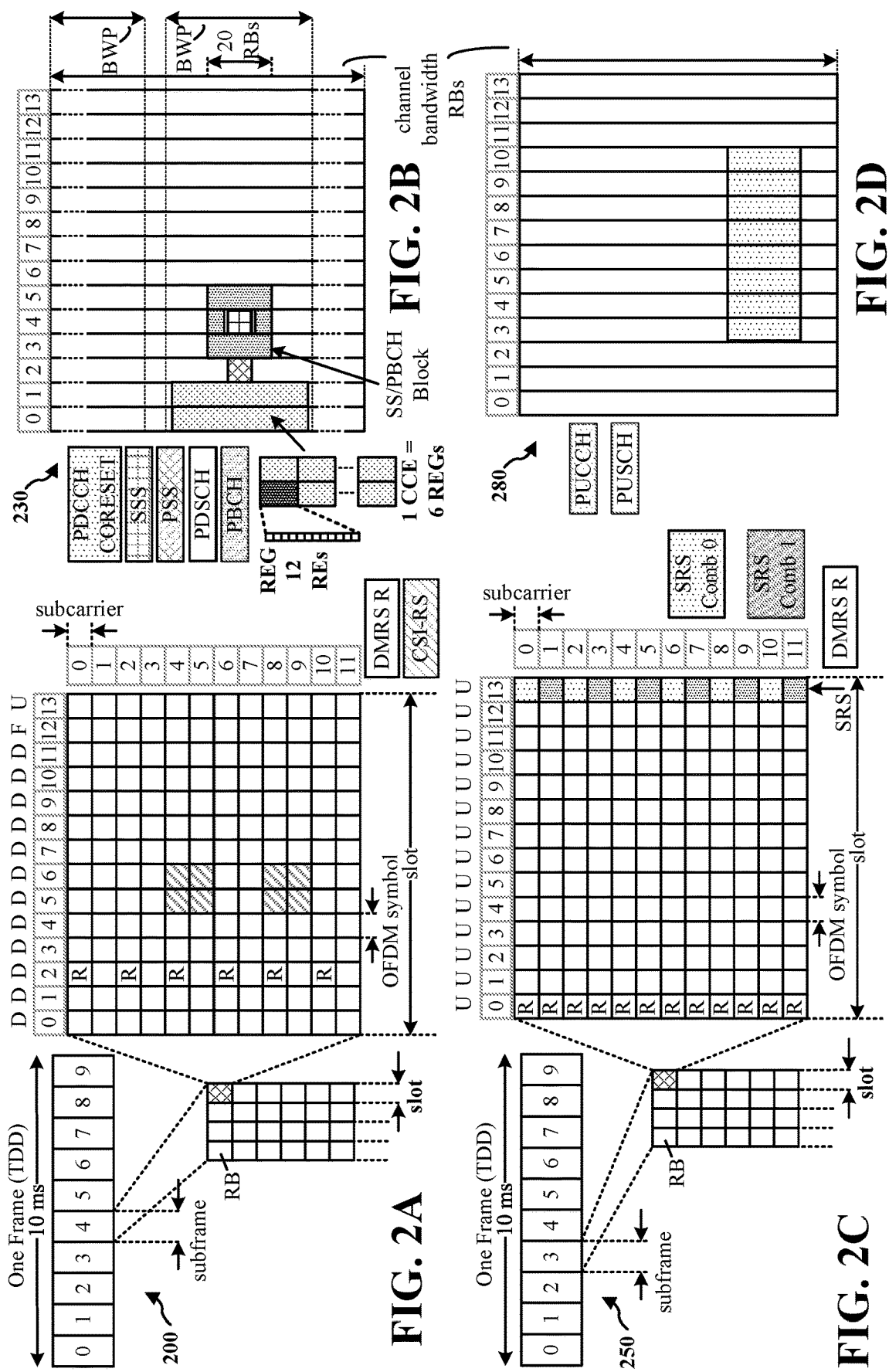
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu 0$ to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
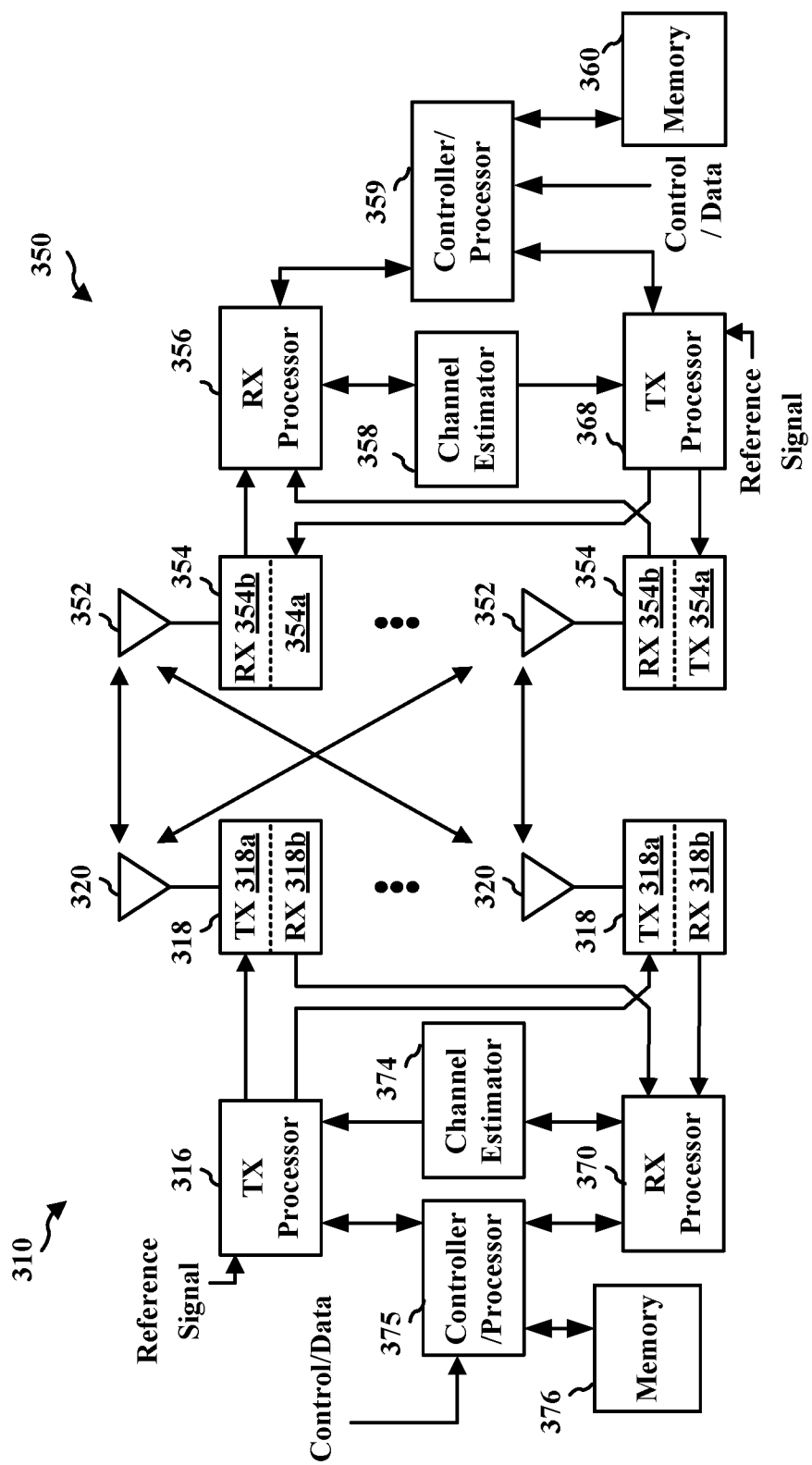
FIG. 3 is a diagram illustrating an example of a base station and a UE in an access network.

FIG. 3 is a block diagram that illustrates an example of a first wireless device that is configured to exchange wireless communication with a second wireless device. In the illustrated example, the first wireless device may include a base station 310, the second wireless device may include a UE 350, and the base station 310 may be in communication with the UE 350 in an access network. As shown in FIG. 3, the base station 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example UE 350 includes antennas 352, a transceiver 354 including a transmitter 354a and a receiver 354b, an RX processor 356, a channel estimator 358, a controller/processor 359, memory 360, and a TX processor 368. In other examples, the base station 310 and/or the UE 350 may include additional or alternative components.

In the DL, IP packets from the EPC 160 may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time-domain and/or the frequency-domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318a. Each transmitter 318a may modulate a radio frequency (RF) carrier with a respective spatial stream for transmission.

At the UE 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency-domain using a Fast Fourier Transform (FFT). The frequency-domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the power saving component 198 of FIG. 1.

At least one of the TX processor 316, the RX processor 370, and the controller/processor 375 may be configured to perform aspects in connection with the configuration component 199 of FIG. 1.

In some scenarios, a UE may monitor a communication link continuously for an indication that the UE may receive data. In other scenarios, a UE may operate in a discontinuous reception (DRX) mode. When in the DRX mode, the UE may enter a low power state to conserve power and/or extend battery life, and may periodically wake up to monitor a control channel for signals relating to the UE.

A UE operating in a DRX mode may operate according to a DRX cycle, which may include a DRX ON duration and a DRX OFF duration. A DRX ON duration may be defined as a period of time during which all or most of the radio components utilized by the UE for receiving are activated or powered-on. A DRX OFF duration may be defined as a period of time during which all or most of the radio components utilized by the UE for receiving are deactivated or powered-off. A DRX ON duration and a DRX OFF duration may make up a DRX cycle. In a connected mode DRX (C-DRX) (or connected DRX mode), the UE may maintain an RRC connection with a base station (e.g., operate in an RRC connected state) while powering off certain radio components of the UE for some predetermined period.

In some examples, a DRX ON duration may also be referred to as a period of time during which the UE is "awake" or operating in an "awake state." Thus, a UE that transitions from a DRX OFF duration to a DRX ON duration may be said to "wake up." In some examples, a DRX OFF duration may also be referred to as a period of time during which the UE is "asleep" or operating in a "low power state." Thus, a UE that transitions from a DRX ON duration to a DRX OFF duration (e.g., from an awake state to a low power state) may be said to "go to sleep."

While operating in the awake state (e.g., during the DRX ON duration), the UE monitors a control channel for signaling related to a downlink transmission. However, such control channel monitoring may be resource intensive and may consume battery power because the control channel may use complex signals that include large amounts of information. For example, the UE may wake up, search for signals on the control channel, decode the signals if the signals are found, and determine whether the decoded signals are relevant to the UE. If the decoded signals are not relevant to the UE or if no signal are found on the control channel, then the battery power used to search for, receive, and decode the signals is wasted.

In some examples, a UE may be configured with a relatively long DRX ON duration. In such scenarios, waking up on each DRX ON duration may have an increased negative impact on battery power use. Moreover, such negative impacts may be appreciated with MTC UEs and/or IoT UEs, which may be configured to occasionally communicate with a network and/or which may be located in remote locations where changing or recharging a battery may be difficult.

In some examples, to improve battery power conservation, the UE may be configured with a wakeup signal (WUS) occasion before the start of the DRX ON duration. During a WUS occasion, certain radio components of the UE may remain in an idle state and processing of a WUS may be performed by the lower layers of the UE. A WUS occasion may refer to a period during which the UE may receive a WUS indicating to the UE to perform control channel monitoring. For example, if the UE detects a WUS during a WUS occasion, the UE wakes up to monitor the control channel for signals. However, when the UE is unable to detect a WUS during the WUS occasion, the UE skips the subsequent DRX ON duration and returns to the low power state until the next DRX cycle. In this way, the UE wakes up to perform complex control channel signal processing when the control channel includes signals relevant to the UE, thereby conserving battery power and resources of the UE.

Figure 4:
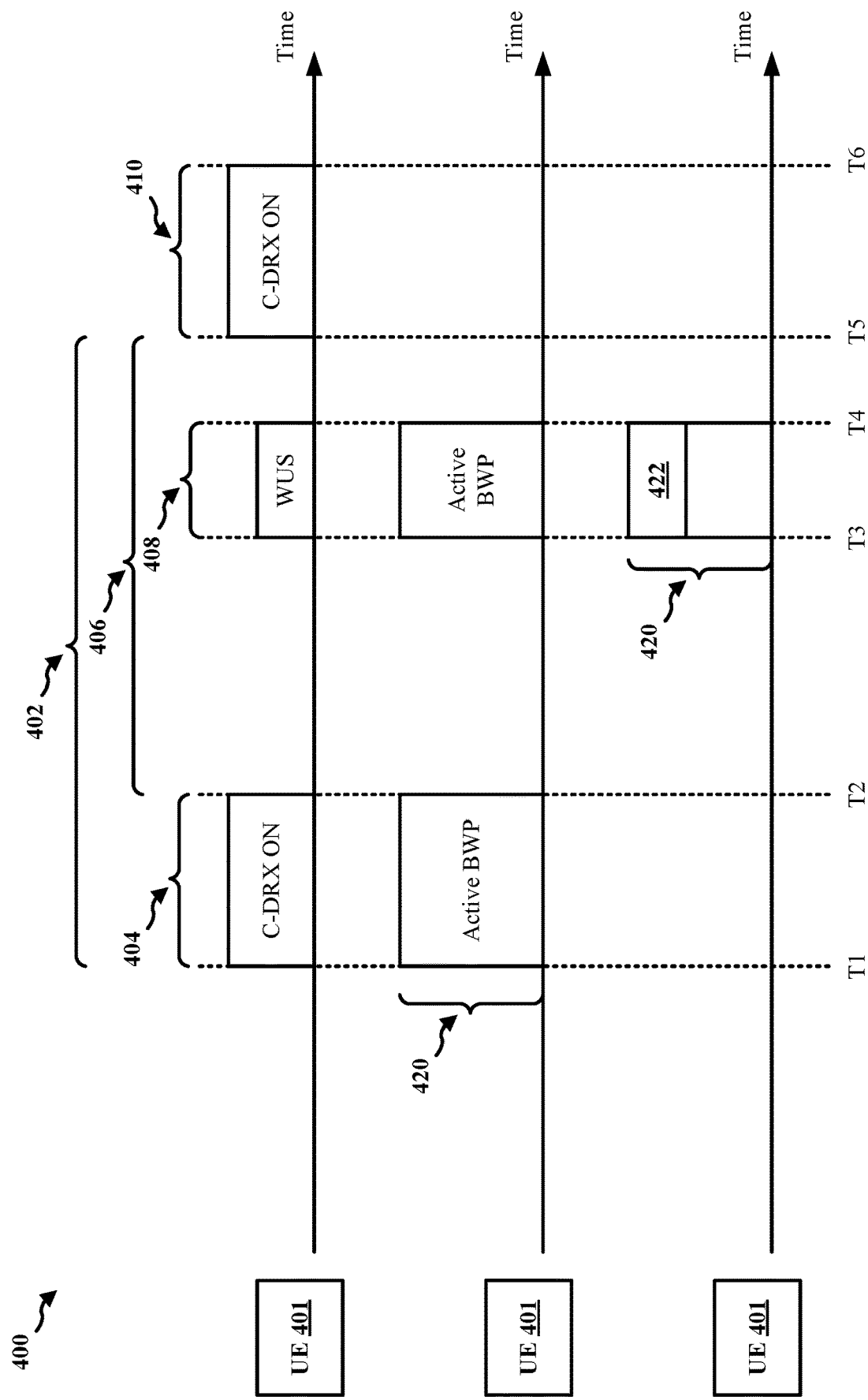
FIG. 4 illustrates an example timeline for a UE operating in connected mode discontinuous reception (C-DRX) mode, in accordance with various aspects of the present disclosure.

FIG. 4 illustrates an example timeline 400 for a UE 401 operating in a C-DRX mode, as presented herein. The example timeline 400 includes a C-DRX cycle 402 including a first C-DRX ON duration 404 and a C-DRX OFF duration 406. As shown in FIG. 4, the first C-DRX ON duration 404 starts at a time T1 and ends at a time T2, and the C-DRX OFF duration 406 starts at the time T2 and ends at a time T5. As mentioned above, the UE 401 may power up radio components during the first C-DRX ON duration 404 and may power down one or more radio components between the C-DRX ON durations (e.g., during the C-DRX OFF duration 406) to conserve power.

To further provide power savings, the UE 401 may be configured with a WUS occasion 408 during which the UE 401 may receive a WUS (e.g., which may be referred to as a "DCI format 2_6," or by any other name). As shown in FIG. 4, the WUS occasion 408 starts at a time T3 and ends at a time T4. In the illustrated example, the WUS occasion 408 has a shorter length (e.g., duration) than a length of the first C-DRX ON duration 404. Thus, the UE 401 may conserve power by foregoing transitioning to an awake state during a subsequent C-DRX ON duration (e.g., a second C-DRX ON duration 410) when the UE 401 is unable to successfully decode a WUS during the WUS occasion 408. However, when the UE 401 successfully decodes a WUS during a WUS occasion, the UE 401 may transition to the awake state during the subsequent C-DRX ON duration (e.g., the second C-DRX ON duration 410) to monitor for control channel signals (e.g., PDCCH).

In the illustrated example of FIG. 4, the UE 401 monitors for control channel signals during the first C-DRX ON duration 404 using an active BWP 420. The UE 401 may be configured with one or more BWPs, for example, after establishing an RRC connection with a base station. A BWP may include a subset of a total cell bandwidth of a cell. The base station may configure the UE 401 with the one or more BWPs using upper layer signaling, such as RRC signaling. Each of the one or more BWPs may be associated with location and frequency information (e.g., a frequency-domain location and a bandwidth) and a subcarrier spacing (e.g., a subcarrier spacing to be used in the respective BWP). Additionally, the base station may indicate which of the one or more BWPs is an active BWP through RRC signaling (e.g., a semi-static indication) or DCI (e.g., a dynamic indication).

In the illustrated example of FIG. 4, when the UE 401 wakes up to monitor for control channel signaling (e.g., PDCCH) during the first C-DRX ON duration 404, the radio frequency (RF) unit of the UE 401 tunes to the active BWP 420. Similarly, when the UE 401 wakes up to monitor for the WUS during the WUS occasion 408, the RF unit of the UE 401 tunes to the active BWP 420. In some examples, the active BWP 420 associated with the WUS occasion 408 may be referred to as a "current camped BWP."

In some examples, a BWP, such as the active BWP 420, may include one or more CORESETs. A CORESET may include frequency and time resources that control channel signaling (e.g., PDCCH) may occupy. A CORESET may be semi-statically configured through upper layer signaling (e.g., RRC signaling) and may be associated with a size, a location, a periodicity, etc. A CORESET may be associated with one or more search spaces, and the search spaces may contain different DCI information for a UE. A base station may provide an association between search spaces and a CORESET.

In some examples, the UE 401 may receive PDCCH configuration information (e.g., which may be referred to as a "PDCCH-ConfigCommon" Information Element (IE), or by any other name) while performing an RRC connection establishment procedure with a base station or via an RRC reconfiguration message. The PDCCH configuration information may include a set of PDCCH candidates for a UE to monitor and that may be defined in terms of PDCCH search space sets. Thus, the UE 401 of FIG. 1 may monitor for PDCCH candidates in one or more search space sets. In some examples, up to ten search space sets may be configured per BWP mapped to one or more CORESETs.

In the illustrated example of FIG. 4, the active BWP 420 includes a WUS bandwidth 422 that is a subset of the active BWP 420. The WUS bandwidth 422 may be defined by a WUS CORESET provided to the UE 401, for example, via the PDCCH configuration information. The WUS CORESET may indicate the time and frequency resources that a WUS may occupy. As shown in FIG. 4, the WUS bandwidth 422 may occupy fewer resources than the active BWP 420. For example, the active BWP 420 may be associated with 100 resource blocks (RBs) indexed from RB 0 to RB 99. In contrast, the WUS bandwidth 422 may occupy 20 RBs indexed from RB 0 to RB 19.

Thus, it may be appreciated that tuning the RF unit of the UE 401 to the active BWP 420 to monitor for a WUS during the WUS occasion 408 may result in wasted battery usage as the active BWP 420 is associated with a larger bandwidth than the WUS bandwidth 422. Aspects disclosed herein provide techniques for conserving resources when monitoring for a WUS during a WUS occasion by enabling the RF unit of the UE 401 to tune to the bandwidth associated with the WUS (e.g., the WUS bandwidth 422) instead of the bandwidth on which the UE 401 is camped (e.g., the active BWP 420).

Figure 5:
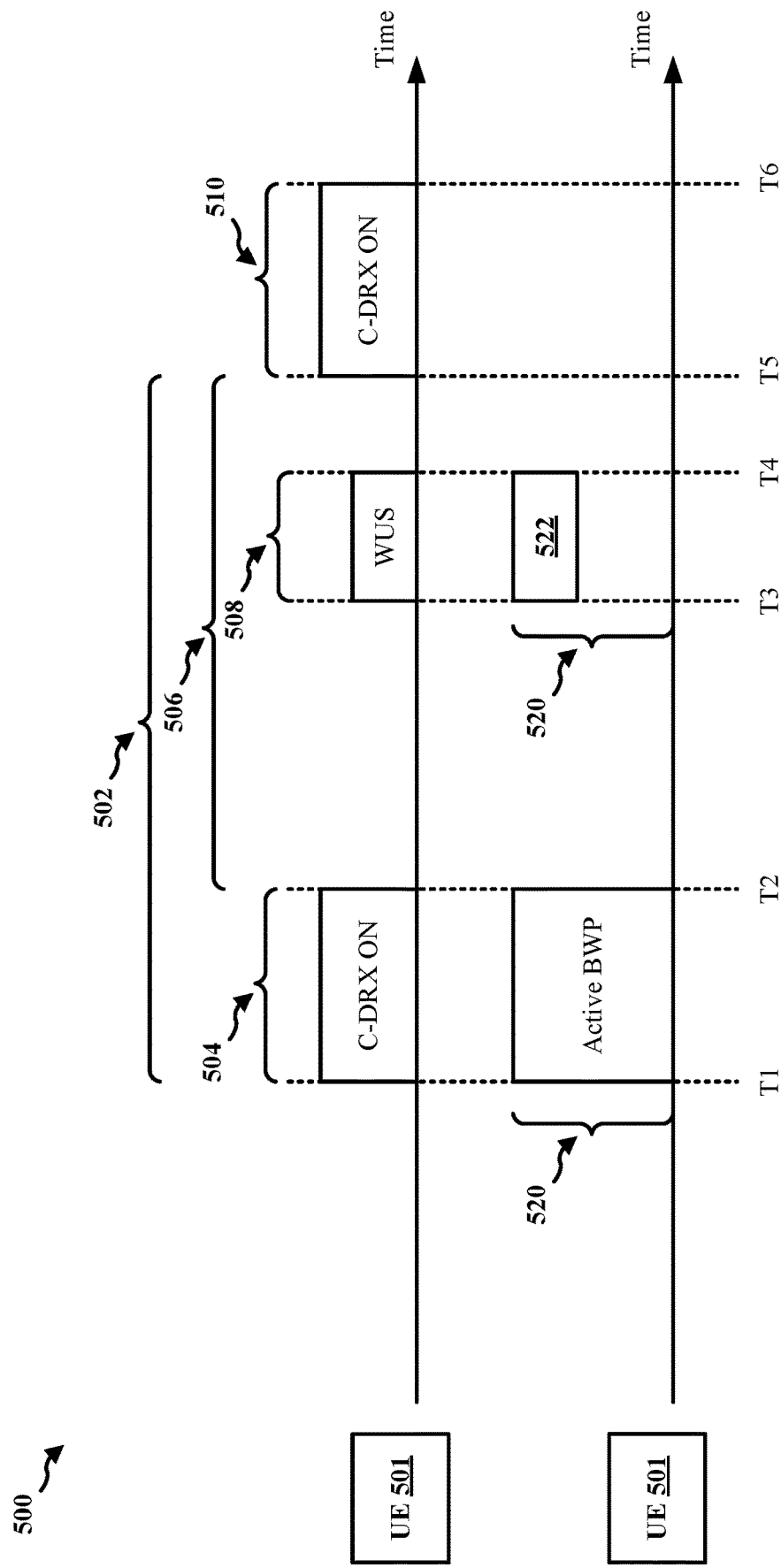
FIG. 5 illustrates an example timeline for a UE operating in a C-DRX mode employing example bandwidth reduction techniques, in accordance with various aspects of the present disclosure.

FIG. 5 illustrates an example timeline 500 for a UE 501 operating in a C-DRX mode employing the example bandwidth reduction techniques, as presented herein Similar to the example of FIG. 4, the example timeline 500 includes a C-DRX cycle 502 including a first C-DRX ON duration 504 and a C-DRX OFF duration 506. As shown in FIG. 5, the first C-DRX ON duration 504 starts at a time T1 and ends at a time T2, and the C-DRX OFF duration 506 starts at the time T2 and ends at a time T5. As mentioned above, the UE 501 may power up radio components during the first C-DRX ON duration 504 and may power down one or more radio components between the C-DRX ON durations (e.g., during the C-DRX OFF duration 506) to conserve power.

To further provide power savings, the UE 501 may be configured with a WUS occasion 508 during which the UE 501 may receive a WUS. As shown in FIG. 5, the WUS occasion 508 starts at a time T3 and ends at a time T4. In the illustrated example, the WUS occasion 508 has a shorter length (e.g., duration) than a length of the first C-DRX ON duration 504. Thus, the UE 501 may conserve power by foregoing transitioning to an awake state during a subsequent C-DRX ON duration (e.g., a second C-DRX ON duration 510) when the UE 501 is unable to successfully decode a WUS during the WUS occasion 508. However, when the UE 501 successfully decodes a WUS during a WUS occasion, the UE 501 may transition to the awake state during the subsequent C-DRX ON duration (e.g., the second C-DRX ON duration 510) to monitor for control channel signals (e.g., PDCCH).

Similar to the example of FIG. 5, the UE 501 monitors for control channel signals during the first C-DRX ON duration 504 using an active BWP 520. The UE 501 may be configured with one or more BWPs, for example, after establishing an RRC connection with a base station. A BWP may include a subset of a total cell bandwidth of a cell. The base station may configure the UE 501 with the one or more BWPs using upper layer signaling, such as RRC signaling. Each of the one or more BWPs may be associated with location and frequency information (e.g., a frequency-domain location and a bandwidth) and a subcarrier spacing (e.g., a subcarrier spacing to be used in the respective BWP). Additionally, the base station may indicate which of the one or more BWPs is an active BWP through RRC signaling (e.g., a semi-static indication) or DCI (e.g., a dynamic indication).

In the illustrated example of FIG. 5, when the UE 501 wakes up to monitor for control channel signaling (e.g., PDCCH) during the first C-DRX ON duration 504, the RF unit of the UE 501 tunes to the active BWP 520. However, when the UE 501 wakes up to monitor for the WUS during the WUS occasion 508, the RF unit of the UE 501 tunes to a WUS bandwidth 522. The WUS bandwidth 522 may be subset of the active BWP 520.

In some examples, the UE 501 may determine the WUS bandwidth 522 based on a WUS CORESET. The UE 501 may receive the WUS CORESET via upper layer signaling, such as RRC signaling. For example, the UE 501 may receive PDCCH configuration information while performing an RRC connection establishment procedure with a base station or via an RRC reconfiguration message. The PDCCH configuration information may include the WUS CORESET. The WUS CORESET may indicate a size of the WUS bandwidth 522, a location of the WUS bandwidth 522, a periodicity associated with the WUS, etc.

By tuning to the bandwidth that the WUS may occupy (e.g., the WUS bandwidth 522) instead of the bandwidth associated with the active BWP (e.g., as shown in the example timeline 400 of FIG. 4), the UE 501 may conserve resources. For example, the UE 501 may conserve battery power and/or processing resources by monitoring fewer resources for the WUS. For example, the WUS bandwidth 522 may occupy 20 RBs while the active BWP 520 may occupy 100 RBs. The WUS bandwidth 522 may be used by lower layers of the UE 501 (e.g., the RF unit of the UE 501) to monitor for control channel signals containing the WUS. Thus, the RF unit of the UE 501 may user fewer resources tuning to the smaller bandwidth associated with the WUS bandwidth 522 that to the bandwidth associated with the active BWP 520.

In some examples, a UE may be configured to monitor for paging while operating in an RRC inactive state (e.g., which may be referred to as an "RRC_INACTIVE" state, or by any other name) or an RRC idle state (e.g., which may be referred to as an "RRC_IDLE" state, or by any other name). A paging message (e.g., a paging DCI, which may be referred to as "DCI format 1_0," or by any other name) may indicate that there is a change in system information, and/or may indicate a public warning system (PWS) notification, such as an Earthquake and Tsunamic Warning System (ETWS) notification or a Commercial Mobile Alert System (CMAS) notification. When the UE receives a paging message while operating in the RRC idle state, the UE may initiate an RRC connection procedure. When the UE receives a paging message while operating in the RRC inactive state, the UE may initiate a connection resumption procedure.

A UE may be configured to monitor for paging via paging configuration information. The UE may receive the paging configuration information via system information, such as SIB 1, or via upper layer signaling, such as RRC signaling. The paging configuration information may indicate information relating to a paging frame and to paging occasions. For example, the paging configuration information may indicate that a paging cycle includes 32 radio frames, 64 radio frames, 128 radio frames, or 256 radio frames. The paging configuration information may also indicate a quantity of paging occasions within a paging frame. For example, a paging frame may include one paging occasion, two paging occasions, or four paging occasions. While the UE may receive a paging message during a paging occasion of a paging frame, the associated information (e.g., the change in the system information and/or the PWS notification) may be received during a subsequent paging frame. That is, for a change or notification in an upcoming cycle, the UE will be paged in a current cycle (or page frame).

When the UE is operating in an RRC connected state and configured with a DRX mode (e.g., a C-DRX mode), the UE may be configured to monitor one paging occasion in every paging frame (sometimes referred to herein as a "modification window"). For example, as the paging frame may include multiple paging occasions, as long as the UE decodes at least one paging message during the paging frame, the UE may determine whether there is a change in system information and/or a PWS notification.

Figure 6:
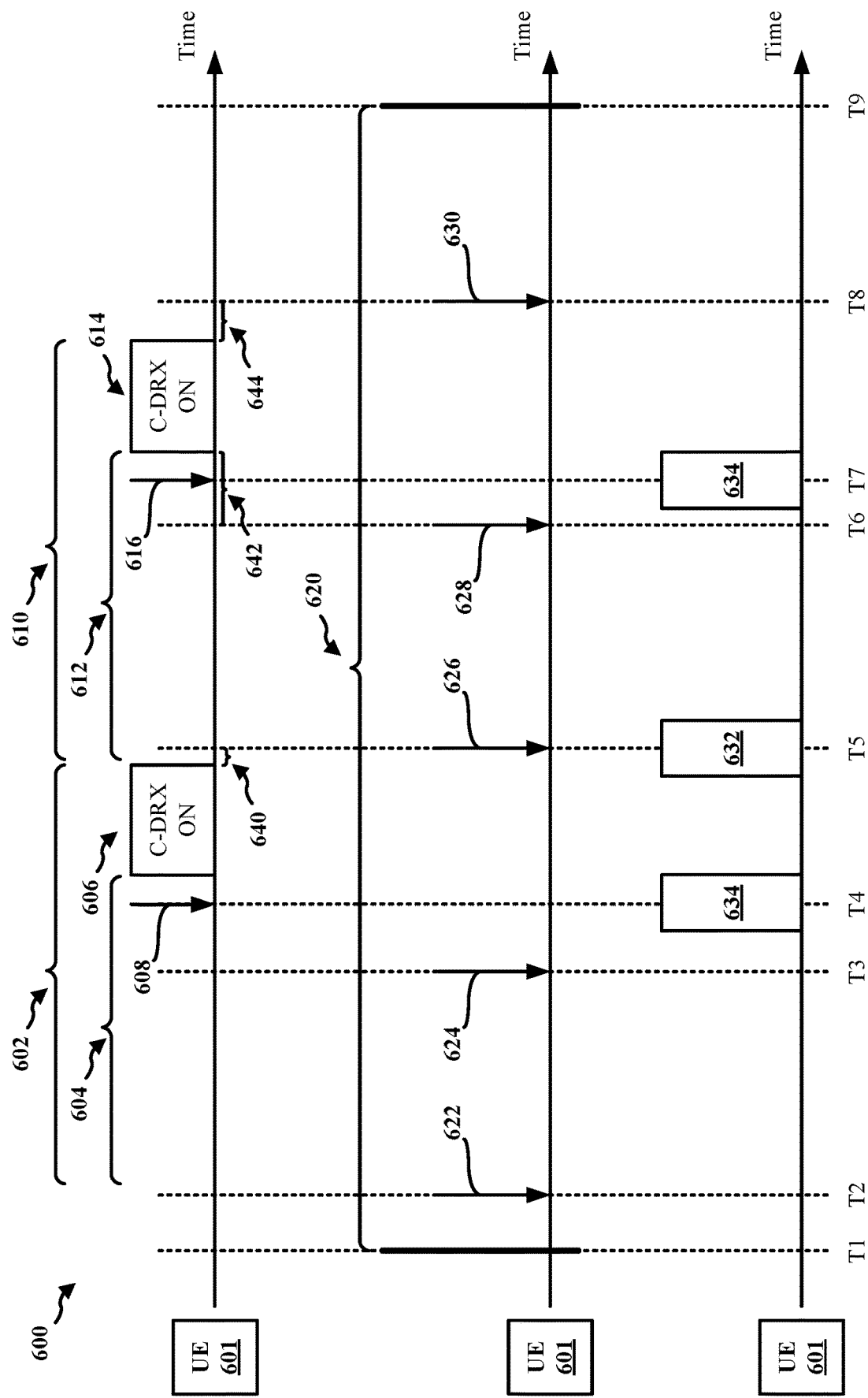
FIG. 6 illustrates an example timeline for a UE operating in a C-DRX mode and configured to monitor for WUS and paging messages, in accordance with various aspects of the present disclosure.

FIG. 6 illustrates an example timeline 600 for a UE 601 operating in a C-DRX mode and configured to monitor for WUS and paging messages, as presented herein. The example timeline 600 includes a first C-DRX cycle 602, including a first C-DRX OFF duration 604 and a first C-DRX ON duration 606, and a second C-DRX cycle 610 including a second C-DRX OFF duration 612 and a second C-DRX ON duration 614.

The example timeline 600 of FIG. 6 also includes a modification window 620 (sometimes referred to as a "SIB modification window" or a "paging frame") that is bounded by a first boundary at a time T1 and a second boundary at a time T9. In the illustrated example of FIG. 6, the modification window 620 includes five example paging occasions. However, other example modification windows may include any suitable quantity of paging occasions. In the example of FIG. 6, a first paging occasion 622 occurs at a time T2, a second paging occasion 624 occurs at a time T3, a third paging occasion 626 occurs at a time T5, a fourth paging occasion 628 occurs at a time T6, and a fifth paging occasion 630 occurs at a time T8.

In examples in which the C-DRX mode is not configured with WUS occasions (and/or the UE 601 is not configured to monitor for WUS), the UE 601 may select a paging occasion that is positioned near a C-DRX ON duration to monitor. For example, the UE 601 may transition from a low power state to an awake state during a paging occasion that overlaps with or is located relatively near in the time-domain to a C-DRX ON duration. In the example of FIG. 6, the third paging occasion 626 is located closer (e.g., in the time-domain) to the first C-DRX ON duration 606 than the fourth paging occasion 628 and the fifth paging occasion 630 are located to the second C-DRX ON duration 614. For example, a first interval 640 associated with the third paging occasion 626 and the first C-DRX ON duration 606 is smaller than a second interval 642 associated with the fourth paging occasion 628 and the second C-DRX ON duration 614 and a third interval 644 associated with the fifth paging occasion 630 and the second C-DRX ON duration 614. However, other examples may use additional or alternative techniques to select the paging occasion that is relatively near in the time-domain to a C-DRX ON duration.

As shown in FIG. 6, the UE 601 may transition from a low power state to an awake state to monitor the third paging occasion 626 for a paging message. For example, the RF unit of the UE 601 may tune to an active BWP 632 to monitor for the paging message at the third paging occasion 626. Similar to the examples of FIG. 4 and FIG. 5, the active BWP 632 may be indicated to the UE 601 by a base station via a semi-static indication (e.g., via RRC signaling) and/or via a dynamic indication (e.g., via DCI).

In some examples, the C-DRX mode may be configured with WUS occasions and the UE 601 may be configured to monitor for WUS. In some such examples, it may be possible for the UE 601 to forego waking up during a C-DRX ON duration if, for example, a WUS is not successfully decoded by the UE 601. For example, the first C-DRX cycle 602 includes a first WUS occasion 608 and the second C-DRX cycle 610 includes a second WUS occasion 616. In some examples, the UE 601 may fail to successfully decode a WUS at the first WUS occasion 608 and the second WUS occasion 616. In such scenarios, the UE 601 may forego transitioning to the awake state for the first C-DRX ON duration 606 and/or the second C-DRX ON duration 614. To avoid the UE 601 from failing to monitor a paging occasion due to the UE 601 not transitioning to an awake state during a C-DRX On duration, the UE 601 may be configured to select a paging occasion to monitor for a paging message that overlaps with or is located relatively near in the time-domain to a C-DRX ON duration regardless of whether the UE 601 successfully decodes a WUS. For example, similar to the example in which the C-DRX mode is not configured with WUS occasions and/or the UE 601 is not configured to monitor for WUS, the UE 601 may select the third paging occasion 626 to monitor for the paging message as the first interval 640 is smaller than the second interval 642 and the third interval 644.

However, the UE 601 may also wake up at WUS occasions to monitor for a WUS. In such examples, the UE 601 wakes up once at a WUS occasion to monitor for a WUS and wakes up a second time at a paging occasion to monitor for a paging message. For example, in the example of FIG. 6, the UE 601 wakes up a first time at a time T4 associated with the first WUS occasion 608, wakes up a second time at a time T5 associated with the third paging occasion 626, and wakes up a third time at a time T7 associated with the second WUS occasion 616. Such scenarios may result in penalties with respect to power as the UE 601 transitions from the low power state to the awake state to monitor for the WUS (e.g., at the time T4 and the time T7) and an additional time to monitor for the paging message (e.g., at the time T5).

As shown in FIG. 6, the UE 601 tunes to a bandwidth 634 associated with monitoring for a WUS. In some examples, the bandwidth 634 may correspond to the active BWP 632. In some examples, the bandwidth 634 may correspond to a WUS bandwidth that is a subset of the active BWP 632 and that is defined by a WUS CORESET, such as the example WUS bandwidth 422 of FIG. 4 and/or the WUS bandwidth 522 of FIG. 5.

Aspects disclosed herein provide techniques for improving power savings at the UE when the UE is configured to monitor WUS occasions and at least one paging occasion. For example, disclosed techniques include the UE selecting a paging occasion that overlaps in time or is relatively near in the time-domain to a WUS occasion. In this way, the UE may conserve resources by reducing the number of transitions from the low power state to the awake state to monitor for the WUS occasions and the paging occasion. For example, with respect to the example timeline 600 of FIG. 6, the UE 601 may determine that the fourth paging occasion 628 is near a WUS occasion (e.g., the second WUS occasion 616) and select the fourth paging occasion 628 to monitor for a paging message. In this way, the UE may reduce the quantity of transitions from the low power state to the active state as a same awake state may be used to monitor for the second WUS occasion 616 and the fourth paging occasion 628.

In the above example, the UE 601 may determine that the fourth paging occasion 628 is near the second WUS occasion 616 based on an interval in the time-domain. However, other examples may use additional or alternative techniques to select the paging occasion that is relatively near to a WUS occasion. For example, the UE may select the one or more paging occasions that are located within a threshold distance or a threshold interval from respective WUS occasions. For example, based on applying a threshold interval, the UE 601 may determine to monitor the second paging occasion 624 with the first WUS occasion 608 and to monitor the fourth paging occasion 628 with the second WUS occasion 616. In this way, the UE 601 may still improve power savings by leveraging the transition to the awake state for the WUS occasions to also monitor for the paging messages instead of transitioning to the awake state for separate WUS occasions and paging occasions.

In some examples, a bandwidth associated with a WUS and a bandwidth associated with a paging message may be of different sizes. For example, the WUS CORESET that defines a WUS bandwidth may indicate that the WUS may occupy 20 RBs (e.g., RB 0 to RB 19) of a 100 RB bandwidth part. A paging CORESET may define a paging bandwidth as occupying 30 RBs (e.g., RB 0 to RB 29) of the 100 RB BWP. In this example, the paging bandwidth (e.g., based on the paging CORESET and/or search spaces) is not fully contained within the WUS bandwidth. Thus, if the UE leverages the WUS occasions to also monitor for the paging messages, then the RF unit of the UE tunes to the larger bandwidth (e.g., the paging bandwidth occupying 30 RBs) to monitor for the WUS and the paging message. However, tuning the RF unit of the UE to the larger bandwidth at each WUS occasion (e.g., due to the larger paging bandwidth) also consumes additional resources (e.g., battery power and/or processing resources) of the UE.

Aspects disclosed herein provide techniques for a UE to improve power savings by configuring the UE to select the paging occasion that is near a WUS occasion and that is also near the end of the modification window to monitor for a paging message. In this way, the UE may wake up at each WUS occasion and tune to the WUS bandwidth associated with the WUS to reduce the bandwidth monitored and, thus, improve power savings at the UE. Additionally, for the selected paging occasion (e.g., the WUS occasion that is near a paging occasion and also located near the end of the modification window), the UE may tune to the larger bandwidth between the WUS bandwidth and the paging bandwidth. Thus, the UE wakes up and tunes to the larger bandwidth associated with the paging bandwidth on one occasion while tuning to the smaller bandwidth associated with the WUS bandwidth for the remaining WUS occasions overlapping in time with the modification window.

Figure 7:
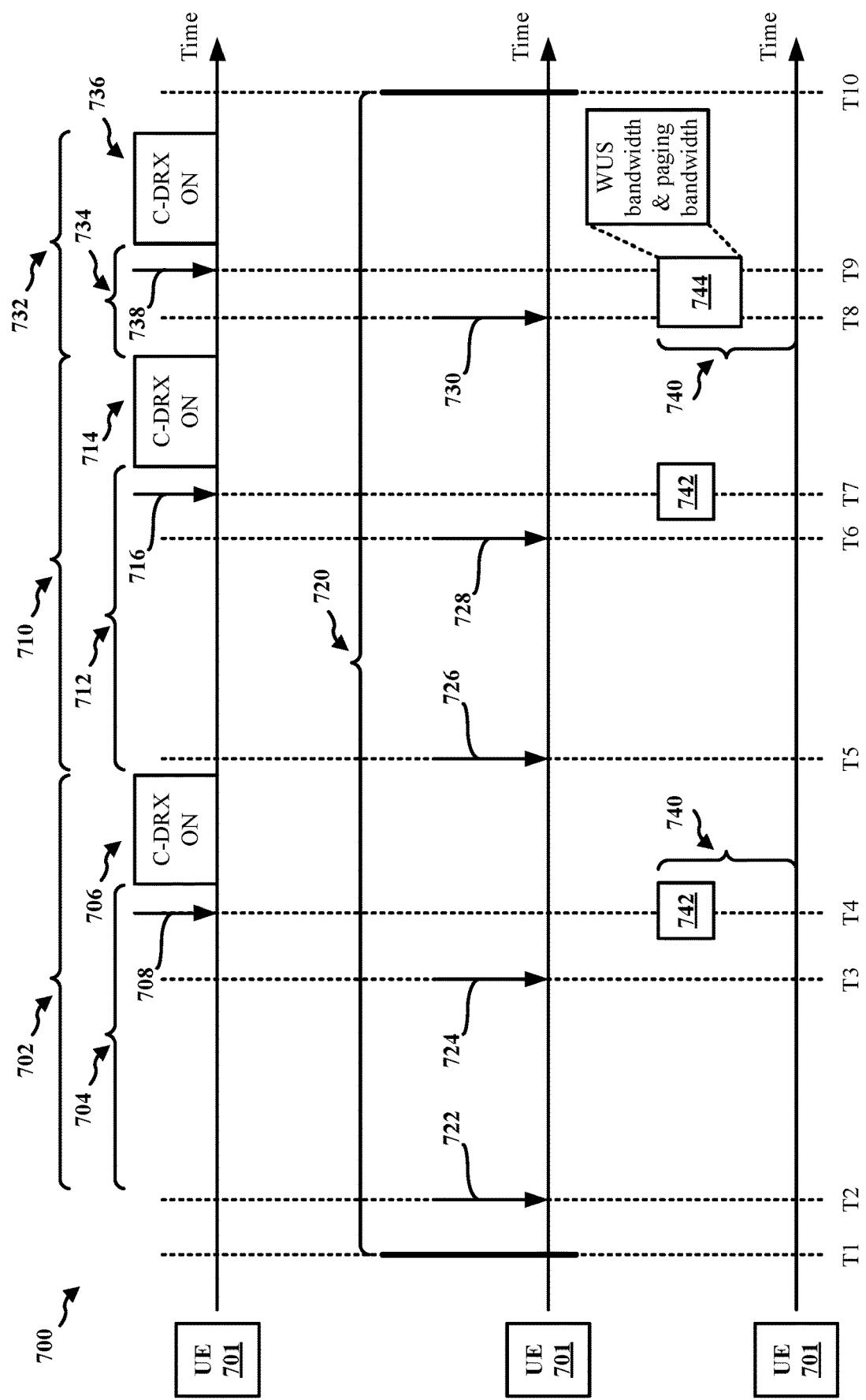
FIG. 7 illustrates an example timeline for a UE operating in a C-DRX mode and configured to monitor for WUS and paging messages, in accordance with various aspects of the present disclosure.

FIG. 7 illustrates an example timeline 700 for a UE 701 operating in a C-DRX mode and configured to monitor for WUS and paging messages, as presented herein. The example timeline 700 includes a first C-DRX cycle 702, a second C-DRX cycle 710, and a third C-DRX cycle 732, and each C-DRX cycle includes an OFF duration, an ON duration, and a WUS occasion. For example, the first C-DRX cycle 702 includes a first C-DRX OFF duration 704, a first C-DRX ON duration 706, and a first WUS occasion 708. The second C-DRX cycle 710 includes a second C-DRX OFF duration 712, a second C-DRX ON duration 714, and a second WUS occasion 716. The third C-DRX cycle 732 includes a third C-DRX OFF duration 734, a third C-DRX ON duration 736, and a third WUS occasion 738.

The example timeline 700 of FIG. 7 also includes a modification window 720 (sometimes referred to as a "SIB modification window" or a "paging frame") that is bounded by a first boundary at a time T1 and a second boundary at a time T10. In the illustrated example of FIG. 7, the modification window 720 includes five example paging occasions. However, other example modification windows may include any suitable quantity of paging occasions. In the example of FIG. 7, a first paging occasion 722 occurs at a time T2, a second paging occasion 724 occurs at a time T3, a third paging occasion 726 occurs at a time T5, a fourth paging occasion 728 occurs at a time T6, and a fifth paging occasion 730 occurs at a time T8.

To improve power savings at the UE when the UE is configured to monitor WUS occasions and at least one paging occasion, the UE 701 is configured to select the paging occasion that is near a WUS occasion and that is also near the end of the modification window to monitor for a paging message. For example, the UE 701 may determine that the fifth paging occasion 730 is near the third WUS occasion 738 and near the end of the modification window 720 (e.g., near the boundary at the time T10) and, thus, select the fifth paging occasion 730 as the paging occasion to monitor for a paging message. In such scenarios, the UE 701 may forego monitoring for a paging message at the other paging occasions of the modification window 720 (e.g., the 722/, the second paging occasion 724, the third paging occasion 726, and the fourth paging occasion 728). In the illustrated example, the UE 701 may determine that the fifth paging occasion 730 is near third WUS occasion 738 based on a comparison of intervals between paging occasions and WUS occasions. However, in other examples, the UE 701 may determine the paging occasion and the WUS occasion that are near each other based on additional or alternative techniques, such as a threshold interval or a threshold distance.

To further improve on power savings at the UE, the UE 701 may monitor for a WUS at the other WUS occasions (e.g., the first WUS occasion 708 and the second WUS occasion 716) using a reduced bandwidth, as described in connection with the example timeline of FIG. 5. For example, the UE 701 may be configured with an active BWP 740. However, when waking up (e.g., transitioning to the awake state) to monitor the first WUS occasion 708 and the second WUS occasion 716, the UE 701 may tune to a WUS bandwidth 742 instead of the active BWP 740. As shown in FIG. 7, the WUS bandwidth 742 is a subset of the active BWP 740 and, thus, may be less power consuming to monitor than the active BWP 740. The WUS bandwidth 742 may be configured via a WUS CORESET and may indicate frequency resources and time resources at which a WUS may occupy. The UE 701 may receive the WUS CORESET via PDCCH configuration information while performing an RRC connection establishment procedure with a base station or via an RRC reconfiguration message.

As shown in FIG. 7, at the monitoring occasion corresponding to the selected paging occasion (e.g., the fifth paging occasion 730), the UE 701 tunes to a bandwidth 744 to monitor for the paging message and the WUS. In the example of FIG. 7, the bandwidth 744 is a subset of the active BWP 740. The bandwidth 744 includes a WUS bandwidth (e.g., the WUS bandwidth 742) and a paging bandwidth. The UE 701 may receive a paging CORESET defining the paging bandwidth via PDCCH configuration information while performing an RRC connection establishment procedure with a base station or via an RRC reconfiguration message.

In the illustrated example of FIG. 7, the UE 701 may conserve resources by reducing the bandwidth monitored during WUS occasions to the WUS bandwidth 742. The UE 701 may also conserve resources by selecting a paging occasion that is near a WUS occasion to reduce the number of times the UE 701 transitions to the awake state from two times (e.g., once for the WUS occasion and again for the paging occasion) to one time. Additionally, the UE 701 may further improve power savings by monitoring the reduced bandwidth (e.g., the WUS bandwidth 742) during the other WUS occasions and monitoring the larger bandwidth associated with the paging occasion and the WUS occasion one time by selecting the paging occasion that is near the WUS occasion and near an end of the modification window 720.

In the illustrated example of FIG. 7, the bandwidth 744 associated with the selected paging occasion (e.g., the fifth paging occasion 730) is larger than the bandwidth associated with the other WUS occasions (e.g., the WUS bandwidth 742 at the first WUS occasion 708 and the second WUS occasion 716). For example, the WUS bandwidth 742 may be associated with 20 RBs (e.g., RB 0 to RB 19 of the active BWP 740 occupying 100 RBs) and the paging bandwidth may be associated with 30 RBs (e.g., RB 0 to RB 29 of the 100 RBs of the active BWP 740). Thus, to monitor for a WUS at the third WUS occasion 738 and a paging message at the fifth paging occasion 730, the UE 701 selects the larger bandwidth, which is associated with the paging bandwidth. However, in other examples, the bandwidth associated with monitoring a WUS occasion and the bandwidth associated with monitoring a paging occasion may be the same. In such examples, the bandwidth 744 and the WUS bandwidth 742 may be a same size. In other examples, the bandwidth associated with monitoring a WUS occasion may be larger than the bandwidth associated with monitoring a paging occasion. In such examples, the bandwidth 744 may be smaller than the WUS bandwidth 742.

Figure 8:
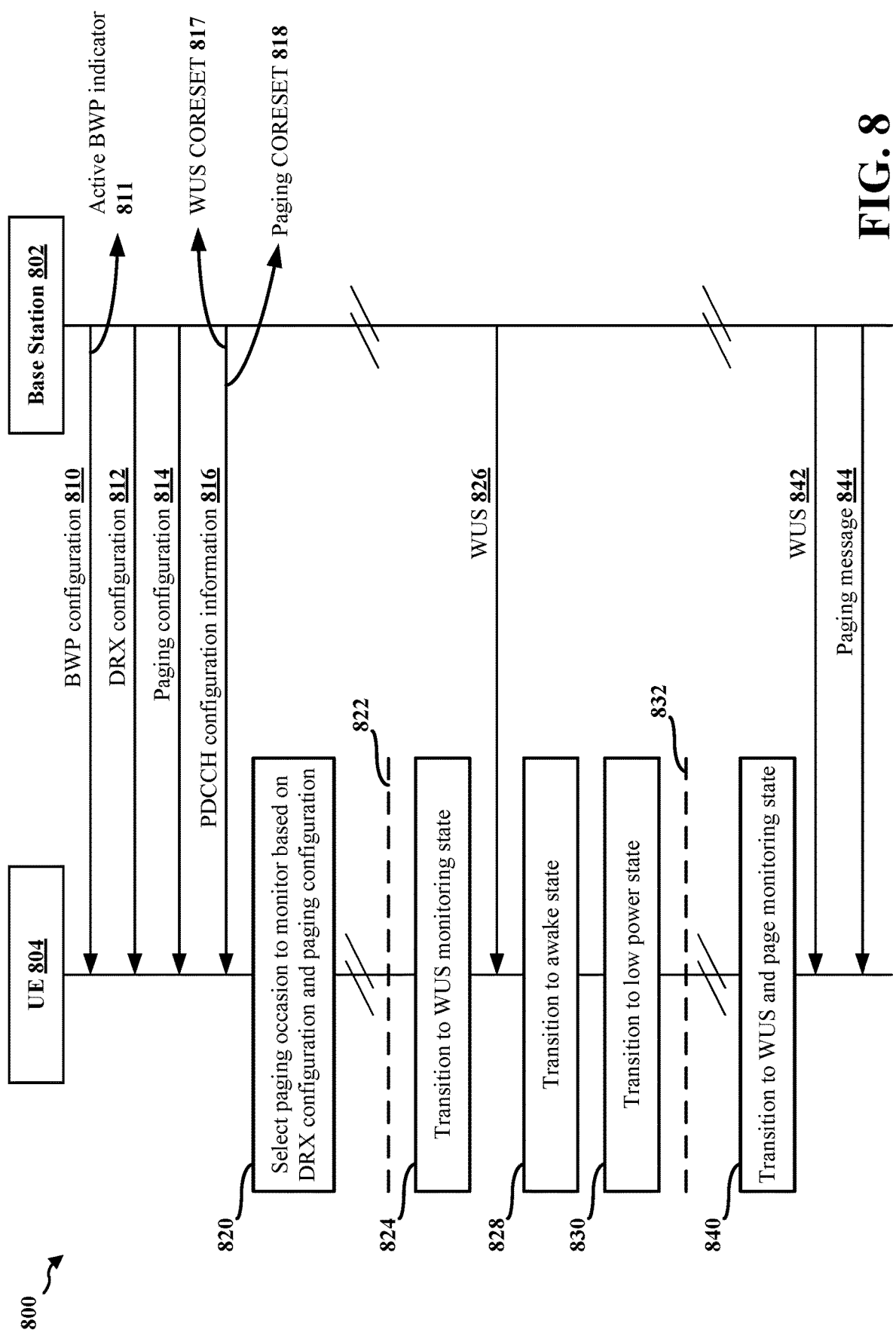
FIG. 8 is an example communication flow between a base station and a UE, in accordance with the teachings disclosed herein.

FIG. 8 illustrates an example communication flow 800 between a base station 802 and a UE 804, as presented herein. In the illustrated example, the communication flow 800 facilitates the UE 804 conserving resources by reducing the bandwidth monitored for receiving a WUS and/or a paging message. Aspects of the base station 802 may be implemented by the base station 102/180 of FIG. 1 and/or the base station 310 of FIG. 3. Aspects of the UE 804 may be implemented by the UE 104 of FIG. 1 and/or the UE 350 of FIG. 3. Although not shown in the illustrated example of FIG. 8, in additional or alternative examples, the base station 802 may be in communication with one or more other base stations or UEs, and/or the UE 804 may be in communication with one or more other base stations or UEs.

In the illustrated example of FIG. 8, the base station 802 configures the UE 804 to perform the example power saving techniques disclosed herein. For example, the base station 802 transmits a BWP configuration 810, a DRX configuration 812, a paging configuration 814, and PDCCH configuration information 816 that is received by the UE 804. The base station 802 may transmit one or more of the BWP configuration 810, the DRX configuration 812, the paging configuration 814, and the PDCCH configuration information 816 via upper layer signaling, such as RRC signaling. For example, the base station 802 may transmit the BWP configuration 810, the DRX configuration 812, the paging configuration 814, and/or the PDCCH configuration information 816 while performing an RRC connection establishment procedure with the UE 804 and/or via an RRC reconfiguration message. Although the example of FIG. 8 illustrates the BWP configuration 810, the DRX configuration 812, the paging configuration 814, and the PDCCH configuration information 816 as separate transmissions, in other examples, one or more of the configurations may be transmitted in a single transmission or a combined transmission.

The example BWP configuration 810 configures the UE 804 with one or more BWPs. Each of the one or more BWPs may be associated with respective location and frequency information (e.g., a frequency-domain location and bandwidth) and subcarrier spacing information (e.g. a subcarrier spacing to be used in the corresponding BWP). The one or more BWPs of the BWP configuration 810 may include a subset of the total cell bandwidth of a cell. In the illustrated example of FIG. 8, the BWP configuration 810 includes an active BWP indicator 811. The active BWP indicator 811 may indicate an active BWP of the one or more BWPs of the BWP configuration 810. The active BWP may indicate a bandwidth that the UE 804 tunes to when operating in an awake state. In some examples, the active BWP may include a default BWP or an initial BWP. The base station 802 may transmit the BWP configuration 810 and/or the active BWP indicator 811 to the UE 804 via one or more of RRC signaling, DCI, and a MAC-CE.

The example DRX configuration 812 configures the UE 804 to operate in a DRX mode. In the illustrated example, the UE 804 is in an RRC connected state, and, thus, the DRX mode may be referred to as a C-DRX mode, as described in connection with the examples of FIGS. 4, 5, 6, and/or 7. The DRX configuration 812 may control the monitoring activity of the UE 804 while operating in the C-DRX mode. While operating in the C-DRX mode, the UE 804 may monitor for PDCCH discontinuously using the DRX operation configured via the DRX configuration 812. The example DRX configuration 812 may include one or more parameters, such as timer values, offset values, transmission and/or reception configurations, etc. Example parameters that may be included in the DRX configuration 812 are listed in example table 900 of FIG. 9. The base station 802 may transmit the DRX configuration 812 to the UE 804 via one or more of RRC signaling, DCI, and a MAC-CE.

The example paging configuration 814 configures the UE 804 to monitor for a paging message. The paging message may be used for notification of one or more UEs. For example, the paging message may notify a UE of a change in system information and/or may indicate a PWS notification. The paging configuration 814 may include a default paging cycle parameter (e.g., which may be referred to as a "defaultPagingCycle" parameter or by any other name) that defines a default paging cycle, a paging frame offset parameter (e.g., which may be referred to as a "nAndPagingFrameOffset" parameter or by any other name) that may be used to derive a number of total paging frames in a period T and paging frame offset, a number of paging occasions parameter (e.g., which may be referred to as "ns" parameter or by any other name) that defines a number of paging occasions per paging frame, and a first monitoring occasion parameter (e.g., which may be referred to as a "firstPDCCH-MonitoringOccasionOfPO" parameter or by any other name) that points out the first PDCCH monitoring occasion for paging of each paging occasion of a paging frame. The base station 802 may transmit the paging configuration 814 to the UE 804 via one or more of RRC signaling, DCI, and a MAC-CE.

The example PDCCH configuration information 816 configures the UE 804 with information to decode PDCCH. For example, the PDCCH configuration information 816 may include CORESET information and/or search space information for decoding different PDCCH. In the illustrated example of FIG. 8, the PDCCH configuration information 816 includes a WUS CORESET 817 and a paging CORESET 818. However, other examples may include information to decode additional or alternative PDCCH. The example WUS CORESET 817 may indicate frequency and time resources that a WUS may occupy. For example, the WUS CORESET 817 may indicate a bandwidth (e.g. a WUS bandwidth), size, location, periodicity, etc. associated with detecting a WUS during a WUS occasion. The example paging CORESET 818 may indicate frequency and time resources that a paging message may occupy. For example, the paging CORESET 818 may indicate a bandwidth (e.g., a paging bandwidth), size, location, periodicity, etc. associated with detecting a paging message during a paging occasion. The base station 802 may transmit PDCCH configuration information 816, the WUS CORESET 817, and/or the paging CORESET 818 to the UE 804 via one or more of RRC signaling, DCI, and a MAC-CE.

In the illustrated example of FIG. 8, a C-DRX cycle starts at a first time 822 and ends at a second time 832. Aspects of the C-DRX cycle may be configured via the DRX configuration 812. In the illustrated example of FIG. 8, the UE 804 is configured to monitor for a WUS at WUS occasions of a C-DRX cycle, as described in connection with the examples of FIG. 5. At 824, the UE 804 transitions to a WUS monitoring state to monitor for a WUS. For example, the UE 804 may transition from the low power state to the WUS monitoring state at a WUS occasion. When the UE 804 transitions to the WUS monitoring state, the RF unit of the UE 804 may tune to a WUS bandwidth, such as the example WUS bandwidth 522 of FIG. 5. The WUS bandwidth may be defined by the WUS CORESET 817 of the PDCCH configuration information 816. In some examples, the WUS bandwidth may be a subset of an active BWP configured for the UE 804. Thus, when the UE 804 transitions to the WUS monitoring state (e.g., at 824), the UE 804 may conserve resources (e.g., battery power and/or processing resources) by monitoring a reduced bandwidth relative to the active BWP.

In some examples, the UE 804 may receive a WUS 826 from the base station 802 during a WUS occasion. For example, the base station 802 may transmit the WUS 826 to the UE 804 to indicate that there is data for the UE 804. In such examples in which the UE 804 successfully decodes the WUS 826, the UE 804 transitions, at 828, to the awake state. For example, the UE 804 may transition to the awake state at the next C-DRX ON duration, as described in connection with the examples of FIG. 5. In some examples, when the UE 804 transitions to the awake state (e.g., at 824), the RF unit of the UE 804 tunes to the active BWP configured for the UE, for example, via the active BWP indicator 811 of the BWP configuration 810.

At 830, the UE 804 transitions to the low power state. For example, the UE 804 may transition to the low power state from the awake state at the end of the C-DRX ON duration. In other examples, the UE 804 may transition to the low power state from the WUS monitoring state. For example, if the UE 804 fails to successfully decode the WUS 826 during the corresponding WUS occasion, the UE 804 may forego transitioning to the awake state at the next C-DRX ON duration and, instead, transition to the low power state.

The UE 804 may then continue to perform the operations associated with the C-DRX mode at the next C-DRX cycle.

In some examples, the UE 804 may be configured to monitor for paging messages. When the UE 804 is operating in a C-DRX mode, the UE 804 may be configured to select one paging occasion from a set of paging occasions of a paging frame to monitor for a paging message. At 820, the UE 804 may select a paging occasion to monitor for the paging occasion based on the DRX configuration 812 and the paging configuration 814. For example, the UE 804 may be configured to select a paging occasion that is near a WUS occasion and that is near an end of a paging frame. The UE 804 may use the DRX configuration 812 and the paging configuration 814 to determine the paging occasion that is near a WUS occasion and that is near an end of a paging frame. For example, and referring to the example timeline 700 of FIG. 7, the UE 804 may select the fifth paging occasion 730 that is near the third WUS occasion 738 and also near the end of the modification window 720.

At 840, the UE 804 may transition to a WUS and page monitoring state. For example, the UE 804 may transition to the WUS and page monitoring state at the paging occasion selected at 820. To improve power savings at the UE 804 when monitoring for the paging message, the WUS and page monitoring state may be associated with a reduced bandwidth compared to the active BWP and that enables the UE 804 to monitor for a WUS and a paging message. For example, the UE 804 (e.g., the RF unit of the UE 804) may tune to a bandwidth that is configured based on the WUS CORESET 817 and the paging CORESET 818. For example, the UE 804 may receive a WUS 842 from the base station 802 at a WUS bandwidth defined by the WUS CORESET 817. Additionally or alternatively, the UE 804 may receive a paging message 844 form the base station 802 at a paging bandwidth defined by the paging CORESET 818.

The bandwidth associated with the WUS and page monitoring state may be a subset of the active BWP configured for the UE 804 via the BWP configuration 810 and/or the active BWP indicator 811. In this way, the UE 804 may conserve resources (e.g., battery power and/or processing resources) while monitoring for a WUS of a C-DRX cycle and a paging message of a paging frame that overlaps, as shown in the example of FIG. 7.

Figure 10:
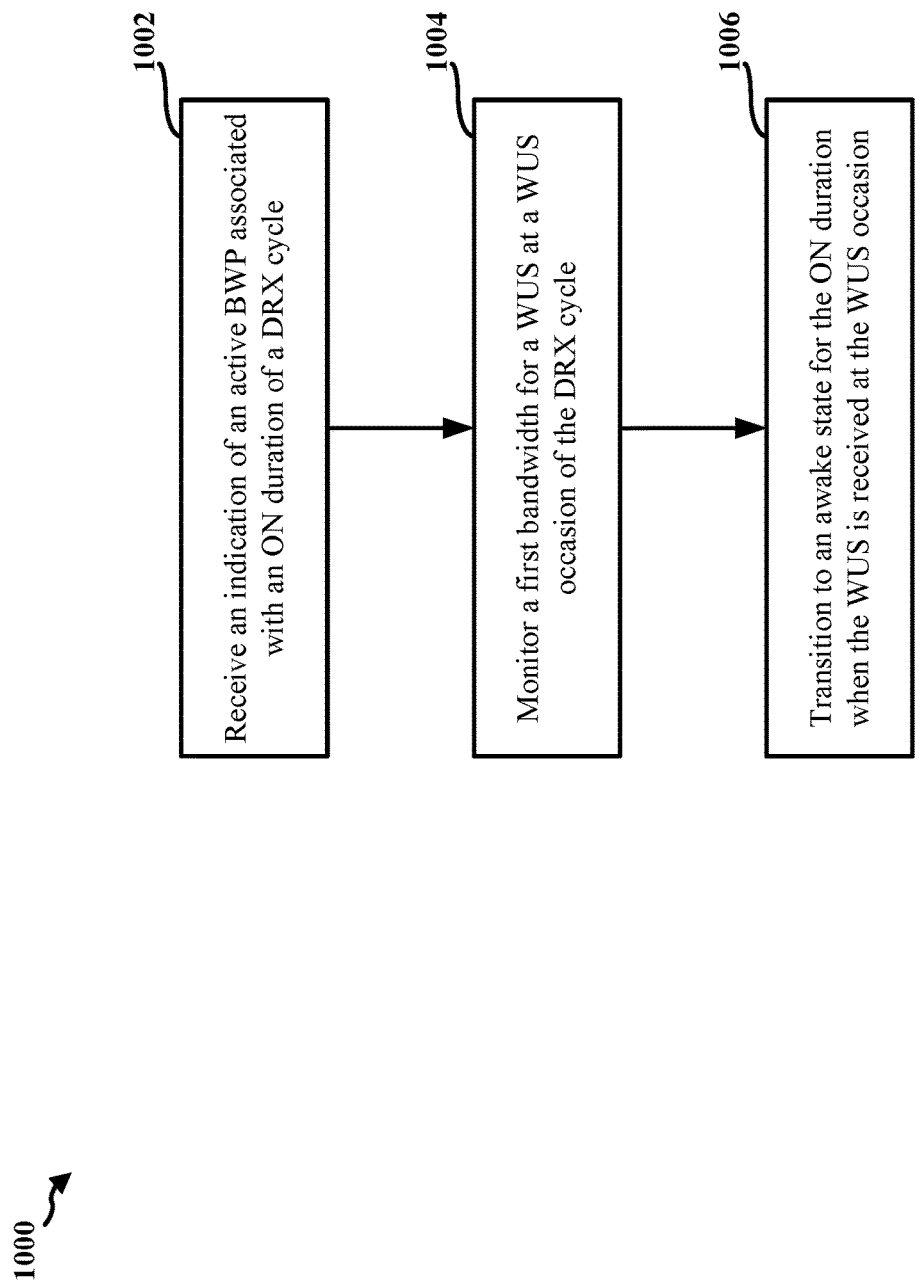
FIG. 10 is a flowchart of a method of wireless communication at a UE, in accordance with the teachings disclosed herein.

FIG. 10 is a flowchart 1000 of a method of wireless communication. The method may be performed by a UE (e.g., the UE 104, the UE 350, the UE 804, and/or an apparatus 1202 of FIG. 12). The method may facilitate improving power savings by enabling a UE to reduce bandwidth while monitoring paging and WUS.

At 1002, the UE receives an indication of an active BWP associated with an ON duration of a DRX cycle, as described in connection with the active BWP indicator 811 of the BWP configuration 810 of FIG. 8. The receiving of the indication of the active BWP, at 1002, may be performed by a BWP component 1240 of the apparatus 1202 of FIG. 12. In some examples, the UE may receive the indication of the active BWP while performing an RRC connection establishment procedure. In some examples, the UE may receive the indication of the active BWP via an RRC reconfiguration message. In some examples, the UE may receive the indication via RRC signaling In some examples, the UE may receive the indication via a MAC-CE. In some examples, the UE may receive the indication via DCI.

At 1004, the UE monitors a first bandwidth for a WUS at a WUS occasion of the DRX cycle, as described in connection with 824 of FIG. 8. The monitoring of the first bandwidth, at 1004, may be performed by a monitor component 1242 of the apparatus 1202 of FIG. 12. The first bandwidth may correspond to a subset of the active BWP, as described in connection with the WUS bandwidth 522 of FIG. 5. Thus, the UE may conserve resources by monitoring a smaller bandwidth for the WUS than the active BWP.

At 1006, the UE transitions to an awake state for the ON duration when the WUS is received at the WUS occasion, as described in connection with 828 of FIG. 8 of FIG. 8. The transitioning to the awake state, at 1006, may be performed by a state component 1244 of the apparatus 1202 of FIG. 12. While operating in the awake state, the UE may monitor the active BWP.

Figure 11:
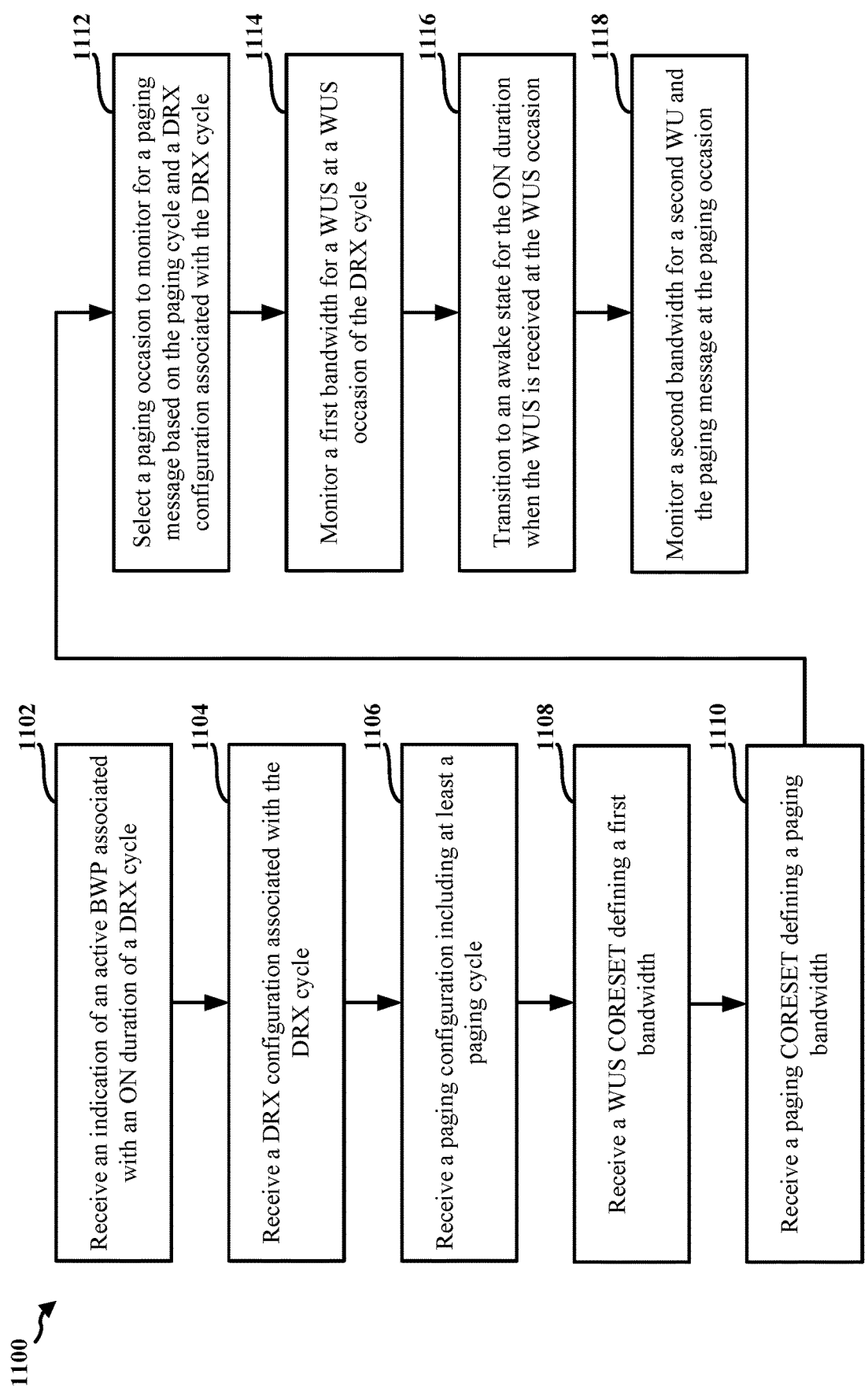
FIG. 11 is a flowchart of a method of wireless communication at a UE, in accordance with the teachings disclosed herein.

FIG. 11 is a flowchart 1100 of a method of wireless communication. The method may be performed by a UE (e.g., the UE 104, the UE 350, the UE 804, and/or an apparatus 1202 of FIG. 12). The method may facilitate improving power savings by enabling a UE to reduce bandwidth while monitoring paging and WUS.

At 1102, the UE receives an indication of an active BWP associated with an ON duration of a DRX cycle, as described in connection with the active BWP indicator 811 of the BWP configuration 810 of FIG. 8. The receiving of the indication of the active BWP, at 1102, may be performed by a BWP component 1240 of the apparatus 1202 of FIG. 12. In some examples, the UE may receive the indication of the active BWP while performing an RRC connection establishment procedure. In some examples, the UE may receive the indication of the active BWP via an RRC reconfiguration message. In some examples, the UE may receive the indication via RRC signaling In some examples, the UE may receive the indication via a MAC-CE. In some examples, the UE may receive the indication via DCI.

At 1104, the UE may receive a DRX configuration associated with the DRX cycle, as described in connection with the DRX configuration 812 of FIG. 8. The receiving of the DRX configuration, at 1104, may be performed by DRX component 1246 of the apparatus 1202 of FIG. 12.

The DRX configuration may configure the UE to operate in a DRX mode. The DRX configuration may control the monitoring activity of the UE while operating in the DRX mode. The DRX configuration may include one or more parameters, such as timer values, offset values, transmission and/or reception configurations, etc. Example parameters that may be included in the DRX configuration 812 are listed in example table 900 of FIG. 9. The UE may receive the DRX configuration via one or more of RRC signaling, DCI, and a MAC-CE.

At 1108, the UE may receive a WUS CORESET defining the first bandwidth, as described in connection with WUS CORESET 817 of FIG. 8. The receiving of the WUS CORESET, at 1108, may be performed by the DRX component 1246 of the apparatus 1202 of FIG. 12.

In some examples, the UE may receive the WUS CORESET via PDCCH configuration information, as described in connection with the PDCCH configuration information 816. In some examples, the UE may receive the WUS CORESET while performing a connection establishment procedure or via an RRC reconfiguration message.

At 1114, the UE monitors a first bandwidth for a WUS at a WUS occasion of the DRX cycle, as described in connection with 824 of FIG. 8. The monitoring of the first bandwidth, at 1114, may be performed by a monitor component 1242 of the apparatus 1202 of FIG. 12. The first bandwidth may correspond to a subset of the active BWP, as described in connection with the WUS bandwidth 522 of FIG. 5. Thus, the UE may conserve resources by monitoring a smaller bandwidth for the WUS than the active BWP.

At 1116, the UE transitions to an awake state for the ON duration when the WUS is received at the WUS occasion, as described in connection with 828 of FIG. 8 of FIG. 8. The transitioning to the awake state, at 1116, may be performed by a state component 1244 of the apparatus 1202 of FIG. 12. While operating in the awake state, the UE may monitor the active BWP.

In some examples, the UE may also be configured to monitor for a paging message while operating in a connected state DRX mode (e.g., a C-DRX mode).

For example, at 1106, the UE may receive a paging configuration including at least a paging cycle, as described in connection with the paging configuration 814 of FIG. 8. The paging cycle may include one or more paging occasions, as described in connection with the example paging occasions of FIG. 7. The receiving of the paging configuration, at 1106, may be performed by a page component 1248 of the apparatus 1202 of FIG. 12.

The paging configuration may configure the UE to monitor for a paging message. The paging message may be used for notification of one or more UEs. For example, the paging message may notify a UE of a change in system information and/or may indicate a PWS notification. The paging configuration may include a default paging cycle parameter that defines a default paging cycle, a paging frame offset parameter that may be used to derive a number of total paging frames in a period T and paging frame offset, a number of paging occasions parameter that defines a number of paging occasions per paging frame, and a first monitoring occasion parameter that points out the first PDCCH monitoring occasion for paging of each paging occasion of a paging frame. The UE may receive the paging configuration via one or more of RRC signaling, DCI, and a MAC-CE.

At 1110, the UE may receive a paging CORESET defining a paging bandwidth, as described in connection with the paging CORESET 818 of FIG. 8. The paging bandwidth may correspond to a second subset of the active BWP, as described in connection with the bandwidth 744 and the active BWP 740 of FIG. 7. The receiving of the paging CORESET, at 1110, may be performed by the page component 1248 of the apparatus 1202 of FIG. 12.

In some examples, the second bandwidth may correspond to a larger bandwidth of the first bandwidth (e.g., the WUS bandwidth) and the paging bandwidth when the first bandwidth and the paging bandwidth at least partially overlap in at least one of the time-domain and a frequency-domain. For example, the UE may determine a larger bandwidth between the first bandwidth and the paging bandwidth when the first bandwidth and the paging bandwidth at least partially overlap in at least one of the time-domain and the frequency-domain. In some such examples, the UE may select the second bandwidth to correspond to the larger bandwidth. For example, the WUS bandwidth may correspond to RBs 0 to 19 and the paging bandwidth may correspond to RBs 0 to 29. In such examples, the second bandwidth may correspond to the larger bandwidth (e.g., the paging bandwidth in this example).

In some examples, the second bandwidth may correspond to the first bandwidth (e.g., the WUS bandwidth) and the paging bandwidth when the first bandwidth and the paging bandwidth are non-overlapping in the time-domain and non-overlapping in a frequency-domain. For example, the UE may determine a combined bandwidth including the first bandwidth and the paging bandwidth when the first bandwidth and the paging bandwidth are non-overlapping in the time-frequency and non-overlapping in the frequency-domain. In some such examples, the UE may select the second bandwidth to correspond to the combined bandwidth. For example, the WUS bandwidth may correspond to RBs 0 to 19 and the paging bandwidth may correspond to RBs 30 to 59. In such examples, the second bandwidth may correspond to a combined bandwidth including the RBs 0 to 19 and the RBs 30 to 59.

In some examples, the UE may receive the paging CORESET via PDCCH configuration information, as described in connection with the PDCCH configuration information 816. In some examples, the UE may receive the paging CORESET while performing a connection establishment procedure or via an RRC reconfiguration message.

At 1112, the UE may select a paging occasion of the one or more paging occasions to monitor for a paging message based on the paging cycle and the DRX cycle, as described in connection with 820 of FIG. 8. The paging occasion may be located near a second WUS occasion of the DRX cycle in a time-domain, as described in connection with the fifth paging occasion 730 that is near the third WUS occasion 738 of FIG. 7. The selecting of the paging occasion, at 1112, may be performed by a selection component 1250 of the apparatus 1202 of FIG. 12.

In some examples, the paging occasion may be located at an end of the paging cycle in the time-domain, as described in connection with the fifth paging occasion 730 that is near the third WUS occasion 738 and also near the end of the modification window 720 of FIG. 7.

At 1118, the UE may monitor a second bandwidth for a second WUS and the paging message at the paging occasion, as described in connection with 840 of FIG. 8. The monitoring of the second bandwidth, at 1118, may be performed by the monitor component 1242 of the apparatus 1202 of FIG. 12. The second bandwidth may correspond to a subset of the active BWP, as described in connection with the bandwidth 744 of FIG. 7. Thus, the UE may conserve resources by monitoring a smaller bandwidth for the WUS and the paging message than the active BWP. In some examples, the UE may transition to an awake state for the ON duration when at least one of the second WUS and the paging message is received at the paging occasion.

Figure 12:
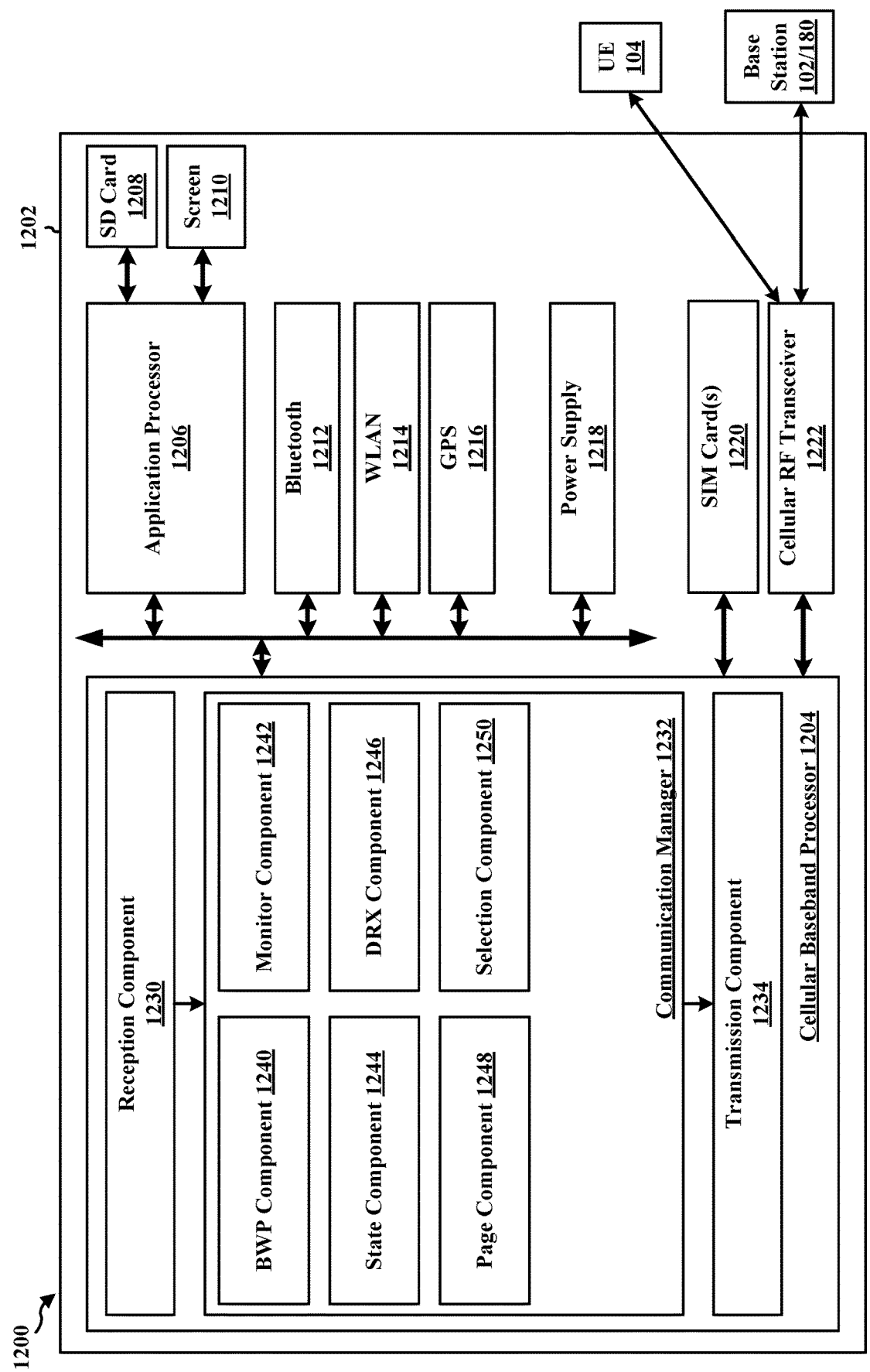
FIG. 12 is a diagram illustrating an example of a hardware implementation for an example apparatus, in accordance with the teachings disclosed herein.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or base station 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the cellular baseband processor 1204, and in another configuration, the apparatus 1202 may be the entire UE (e.g., see the UE 350 of FIG. 3) and include the additional modules of the apparatus 1202.

The communication manager 1232 includes a BWP component 1240 that is configured to receive an indication of an active BWP associated with an ON duration of a DRX cycle, for example, as described in connection with 1002 of FIGS. 10 and/or 1102 of FIG. 11.

The communication manager 1232 also includes a monitor component 1242 that is configured to monitor a first bandwidth for a WUS at a WUS occasion of the DRX cycle, for example, as described in connection with 1004 of FIGS. 10 and/or 1114 of FIG. 11. The example monitor component 1242 may also be configured to monitor a second bandwidth for a second WU and the paging message at the paging occasion, for example, as described in connection with 1118 of FIG. 11.

The communication manager 1232 also includes a state component 1244 that is configured to transition to an awake state for the ON duration when the WUS is received at the WUS occasion, for example, as described in connection with 1006 of FIGS. 10 and/or 1116 of FIG. 11.

The communication manager 1232 also includes a DRX component 1246 that is configured to receive a DRX configuration associated with the DRX cycle, for example, as described in connection with 1104 of FIG. 11. The example DRX component 1246 may also be configured to receive a WUS CORESET defining a first bandwidth, for example, as described in connection with 1108 of FIG. 11.

The communication manager 1232 also includes a page component 1248 that is configured to receive a paging configuration including at least a paging cycle, for example, as described in connection with 1106 of FIG. 11. The example page component 1248 may also be configured to receive a paging CORESET defining a paging bandwidth, for example, as described in connection with 1110 of FIG. 1.

The communication manager 1232 also includes a selection component 1250 that is configured to select a paging occasion to monitor for a paging message based on the paging cycle and a DRX configuration associated with the DRX cycle, for example, as described in connection with 1112 of FIG. 11.

The apparatus may include additional components that perform each of the blocks of the algorithm in the flowcharts of FIGS. 10 and/or 11. As such, each block in the flowcharts of FIGS. 10 and/or 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for receiving an indication of an active BWP associated with an ON duration of a DRX cycle. The example apparatus 1202 also includes means for monitoring a first bandwidth for a WUS at a WUS occasion of the DRX cycle, the first bandwidth corresponding to a subset of the active BWP. The example apparatus 1202 also includes means for transitioning to an awake state for the ON duration when the WUS is received at the WUS occasion.

In another configuration, the example apparatus 1202 also includes means for receiving a WUS CORESET defining the first bandwidth.

In another configuration, the example apparatus 1202 also includes means for receiving the WUS CORESET via physical downlink control channel configuration information.

In another configuration, the example apparatus 1202 also includes means for receiving the WUS CORESET while performing a connection establishment procedure or via a RRC reconfiguration message.

In another configuration, the example apparatus 1202 also includes means for receiving a paging configuration including at least a paging cycle, the paging cycle including one or more paging occasions. The example apparatus 1202 also includes means for selecting a paging occasion of the one or more paging occasions to monitor for a paging message based on the paging cycle and the DRX cycle, the paging occasion located near a second WUS occasion of the DRX cycle in a time-domain. The example apparatus 1202 also includes means for monitoring a second bandwidth for a second WUS and the paging message at the paging occasion.

In another configuration, the example apparatus 1202 also includes means for determining a larger bandwidth between the first bandwidth and the paging bandwidth when the first bandwidth and the paging bandwidth at least partially overlap in at least one of the time-domain and a frequency-domain, where the second bandwidth corresponds to the larger bandwidth.

In another configuration, the example apparatus 1202 also includes means for determining a combined bandwidth including the first bandwidth and the paging bandwidth when the first bandwidth and the paging bandwidth are non-overlapping in the time-domain and non-overlapping in a frequency-domain, wherein the second bandwidth corresponds to the combined bandwidth.

In another configuration, the example apparatus 1202 also includes means for receiving a paging CORESET defining a paging bandwidth corresponding to a second subset of the active BWP.

In another configuration, the example apparatus 1202 also includes means for receiving the paging CORESET via physical downlink control channel configuration information.

The means may be one or more of the components of the apparatus 1202 configured to perform the functions recited by the means. As described supra, the apparatus 1202 may include the TX processor 368, the RX processor 356, and the controller/processor 359. As such, in one configuration, the means may be the TX processor 368, the RX processor 356, and the controller/processor 359 configured to perform the functions recited by the means.

Figure 13:
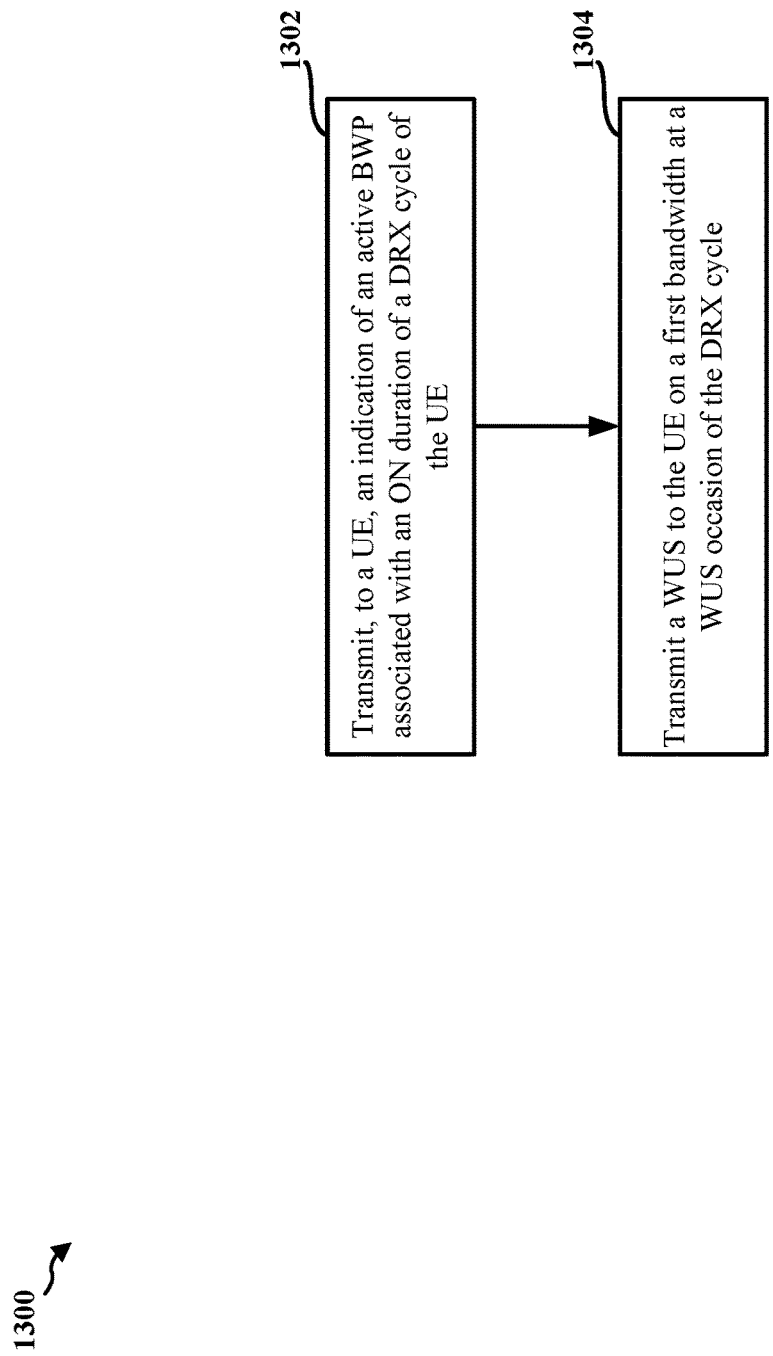
FIG. 13 is a flowchart of a method of wireless communication at a base station, in accordance with the teachings disclosed herein.

FIG. 13 is a flowchart 1300 of a method of wireless communication. The method may be performed by a base station (e.g., the base station 102/180, the base station 310, the base station 802, and/or an apparatus 1502 of FIG. 15). The method may facilitate improving power savings by enabling a UE to reduce bandwidth while monitoring paging and WUS.

At 1302, the base station transmits, to a UE, an indication of an active BWP associated with an ON duration of a DRX cycle of the UE, as described in connection with the active BWP indicator 811 of the BWP configuration 810 of FIG. 8. The transmitting of the indication of the active BWP, at 1302, may be performed by a BWP component 1540 of the apparatus 1502 of FIG. 15.

In some examples, the base station may transmit the indication of the active BWP while performing an RRC connection establishment procedure. In some examples, the base station may transmit the indication of the active BWP via an RRC reconfiguration message. In some examples, the base station may transmit the indication via RRC signaling. In some examples, the base station may transmit the indication via a MAC-CE. In some examples, the base station may transmit the indication via DCI.

At 1304, the base station transmits a WUS to the UE on a first bandwidth at a WUS occasion of the DRX cycle, as described in connection with the WUS 826 of FIG. 8. The transmitting of the WUS, at 1304, may be performed by WUS component 1542 of the apparatus 1502 of FIG. 15. The first bandwidth may correspond to a subset of the active BWP, as described in connection with the WUS bandwidth 522 of FIG. 5.

Figure 14:
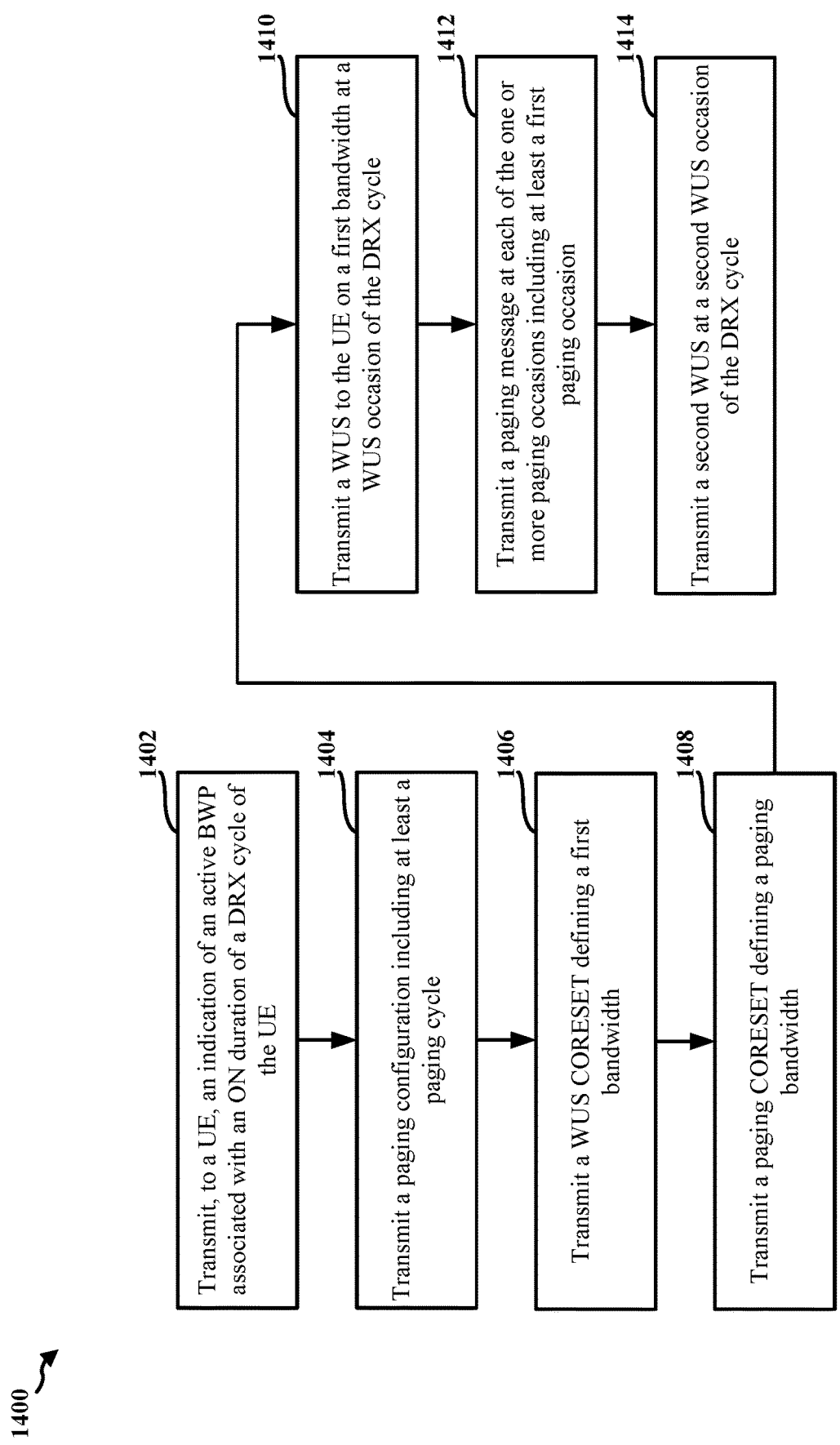
FIG. 14 is a flowchart of a method of wireless communication at a base station, in accordance with the teachings disclosed herein.

FIG. 14 is a flowchart 1400 of a method of wireless communication. The method may be performed by a base station (e.g., the base station 102/180, the base station 310, the base station 802, and/or an apparatus 1502 of FIG. 15). The method may facilitate improving power savings by enabling a UE to reduce bandwidth while monitoring paging and WUS.

At 1402, the base station transmits, to a UE, an indication of an active BWP associated with an ON duration of a DRX cycle of the UE, as described in connection with the active BWP indicator 811 of the BWP configuration 810 of FIG. 8. The transmitting of the indication of the active BWP, at 1402, may be performed by a BWP component 1540 of the apparatus 1502 of FIG. 15.

In some examples, the base station may transmit the indication of the active BWP while performing an RRC connection establishment procedure. In some examples, the base station may transmit the indication of the active BWP via an RRC reconfiguration message. In some examples, the base station may transmit the indication via RRC signaling. In some examples, the base station may transmit the indication via a MAC-CE. In some examples, the base station may transmit the indication via DCI.

At 1406, the base station may transmit a WUS CORESET defining a first bandwidth, as described in connection with WUS CORESET 817 of FIG. 8. The transmitting of the WUS CORESET, at 1406, may be performed by a configuration component 1544 of the apparatus 1502 of FIG. 15.

In some examples, the base station may transmit the WUS CORESET via PDCCH configuration information, as described in connection with the PDCCH configuration information 816. In some examples, the base station may transmit the WUS CORESET while performing a connection establishment procedure or via an RRC reconfiguration message.

At 1410, the base station transmits a WUS to the UE on a first bandwidth at a WUS occasion of the DRX cycle, as described in connection with the WUS 826 of FIG. 8. The transmitting of the WUS, at 1410, may be performed by WUS component 1542 of the apparatus 1502 of FIG. 15. The first bandwidth may correspond to a subset of the active BWP, as described in connection with the WUS bandwidth 522 of FIG. 5.

In some examples, the base station may transmit paging messages to the UE while the UE is operating in a connected state DRX mode (e.g., a C-DRX mode).

At 1404, the base station may transmit a paging configuration including at least a paging cycle, as described in connection with the paging configuration 814 of FIG. 8. The paging cycle may include one or more paging occasions, as described in connection with the example paging occasions of FIG. 7. The transmitting of the paging configuration, at 1404, may be performed by the configuration component 1544 of the apparatus 1502 of FIG. 15.

The paging configuration may configure the UE to monitor for a paging message. The paging message may be used for notification of one or more UEs. For example, the paging message may notify a UE of a change in system information and/or may indicate a PWS notification. The paging configuration may include a default paging cycle parameter that defines a default paging cycle, a paging frame offset parameter that may be used to derive a number of total paging frames in a period T and paging frame offset, a number of paging occasions parameter that defines a number of paging occasions per paging frame, and a first monitoring occasion parameter that points out the first PDCCH monitoring occasion for paging of each paging occasion of a paging frame. The base station may transmit the paging configuration via one or more of RRC signaling, DCI, and a MAC-CE.

At 1408, the base station may transmit a paging CORESET defining a paging bandwidth corresponding to a second subset of the active BWP, as described in connection with the paging CORESET 818 of FIG. 8. The transmitting of the paging CORESET, at 1408, may be performed by the configuration component 1544 of the apparatus 1502 of FIG. 15. In some examples, the base station may transmit the paging CORESET via PDCCH configuration information, as described in connection with the PDCCH configuration information 816. In some examples, the base station may transmit the paging CORESET while performing a connection establishment procedure or via an RRC reconfiguration message.

In some examples, the first bandwidth and the paging bandwidth at least partially overlap in at least one of the time-domain and a frequency-domain. For example, the WUS bandwidth may correspond to RBs 0 to 19 and the paging bandwidth may correspond to RBs 0 to 29.

In some examples, the first bandwidth and the paging bandwidth are non-overlapping in the time-domain and non-overlapping in a frequency-domain. For example, the WUS bandwidth may correspond to RBs 0 to 19 and the paging bandwidth may correspond to RBs 30 to 59.

At 1412, the base station may transmit a paging message at each of the one or more paging occasion including at least a first paging occasion, as described in connection with the paging occasions and the fifth paging occasion 730 of FIG. 7, and the paging message 844 of FIG. 8. The transmitting of the paging message, at 1412, may be performed by a page component 1546 of the apparatus 1502 of FIG. 15.

At 1414, the base station may transmit a second WUS at a second WUS occasion of the DRX cycle, the first paging occasion located near the second WUS occasion of the DRX cycle in a time-domain, as described in connection with the fifth paging occasion 730 that is near the third WUS occasion 738 of FIG. 7. The transmitting of the second WUS, at 1414, may be performed by the WUS component 1542 of the apparatus 1502 of FIG. 15.

In some examples, the first paging occasion may be located at an end of the paging cycle in the time-domain, as described in connection with the fifth paging occasion 730 that is near the third WUS occasion 738 and also near the end of the modification window 720 of FIG. 7.

Figure 15:
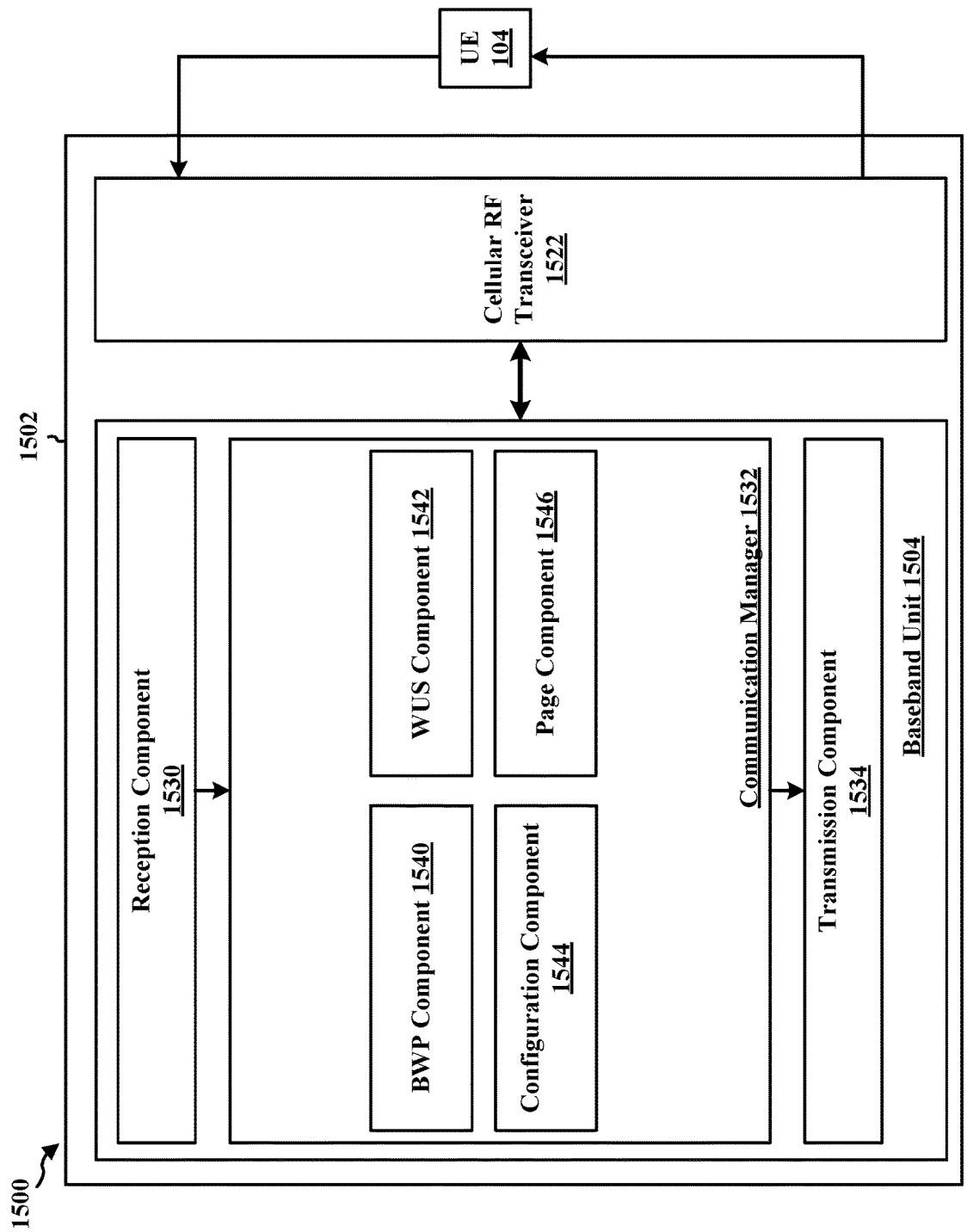
FIG. 15 is a diagram illustrating an example of a hardware implementation for an example apparatus, in accordance with the teachings disclosed herein.

FIG. 15 is a diagram 1500 illustrating an example of a hardware implementation for an apparatus 1502. The apparatus 1502 may be a base station, a component of a base station, or may implement base station functionality. In some aspects, the apparatus 1502 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 includes a BWP component 1540 that is configured to transmit, to a UE, an indication of an active BWP associated with an ON duration of a DRX cycle of the UE, for example, as described in connection with 1302 of FIGS. 13 and/or 1402 of FIG. 14.

The communication manager 1532 also includes a WUS component 1542 that is configured to transmit a WUS to the UE on a first bandwidth at a WUS occasion of the DRX cycle, for example, as described in connection with 1304 of FIGS. 13 and/or 1410 of FIG. 14. The communication manager 1532 also includes a WUS component 1542 that is configured to transmit a second WUS at a second WUS occasion of the DRX cycle, for example, as described in connection with 1414 of FIG. 14.

The communication manager 1532 also includes a configuration component 1544 that is configured to transmit a WUS CORESET defining a first bandwidth, for example, as described in connection with 1406 of FIG. 14. The example configuration component 1544 may also be configured to transmit a paging configuration including at least a paging cycle, for example, as described in connection with 1404 of FIG. 14. The example configuration component 1544 may also be configured to transmit a paging CORESET defining a paging bandwidth, for example, as described in connection with 1408 of FIG. 14.

The communication manager 1532 also includes a page component 1546 that is configured to transmit a paging message at each of the one or more paging occasions including at least a first paging occasion, for example, as described in connection with 1412 of FIG. 14.

The apparatus may include additional components that perform each of the blocks of the algorithm in the flowcharts of FIGS. 13 and/or 14. As such, each block in the flowcharts of FIGS. 13 and/or 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for transmitting, to a UE, an indication of an active BWP associated with an ON duration of a DRX cycle of the UE. The example apparatus 1502 also includes means for transmitting a WUS to the UE on a first bandwidth at a WUS occasion of the DRX cycle, the first bandwidth corresponding to a subset of the active BWP.

In another configuration, the example apparatus 1502 also includes means for transmitting a WUS CORESET defining the first bandwidth.

In another configuration, the example apparatus 1502 also includes means for transmitting the WUS CORESET via physical downlink control channel configuration information.

In another configuration, the example apparatus 1502 also includes means for transmitting the WUS CORESET while performing a connection establishment procedure or via a RRC reconfiguration message.

In another configuration, the example apparatus 1502 also includes means for transmitting a paging configuration including at least a paging cycle, the paging cycle including one or more paging occasions. The example apparatus 1502 also includes means for transmitting a paging message at each of the one or more paging occasions including at least a first paging occasion. The example apparatus 1502 also includes means for transmitting a second WUS at a second WUS occasion of the DRX cycle, the first paging occasion located near the second WUS occasion of the DRX cycle in a time-domain.

In another configuration, the example apparatus 1502 also includes means for transmitting a paging CORESET defining a paging bandwidth corresponding to a second subset of the active BWP.

In another configuration, the example apparatus 1502 also includes means for transmitting the paging CORESET via physical downlink control channel configuration information.

The means may be one or more of the components of the apparatus 1502 configured to perform the functions recited by the means. As described supra, the apparatus 1502 may include the TX processor 316, the RX processor 370, and the controller/processor 375. As such, in one configuration, the means may be the TX processor 316, the RX processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive an indication of an active BWP associated with an ON duration of a DRX cycle; monitor a first bandwidth for a WUS at a WUS occasion of the DRX cycle, the first bandwidth corresponding to a subset of the active BWP; and transition to an awake state for the ON duration when the WUS is received at the WUS occasion.

Aspect 2 is the apparatus of aspect 1, further including that the at least one processor is further configured to: receive a WUS CORESET defining the first bandwidth.

Aspect 3 is the apparatus of any of aspects 1 and 2, further including that the at least one processor is further configured to: receive the WUS CORESET via physical downlink control channel configuration information.

Aspect 4 is the apparatus of any of aspects 1 to 3, further including that the at least one processor is further configured to: receive the WUS CORESET while performing a connection establishment procedure or via a RRC reconfiguration message.

Aspect 5 is the apparatus of any of aspects 1 to 4, further including that the at least one processor is further configured to: receive a paging configuration including at least a paging cycle, the paging cycle including one or more paging occasions; select a paging occasion of the one or more paging occasions to monitor for a paging message based on the paging cycle and the DRX cycle, the paging occasion located near a second WUS occasion of the DRX cycle in a time-domain; and monitor a second bandwidth for a second WUS and the paging message at the paging occasion.

Aspect 6 is the apparatus of any of aspects 1 to 5, further including that the paging occasion is located at an end of the paging cycle in the time-domain.

Aspect 7 is the apparatus of any of aspects 1 to 6, further including that the at least one processor is further configured to: receive a paging CORESET defining a paging bandwidth corresponding to a second subset of the active BWP.

Aspect 8 is the apparatus of any of aspects 1 to 7, further including that the at least one processor is further configured to: determine a larger bandwidth between the first bandwidth and the paging bandwidth when the first bandwidth and the paging bandwidth at least partially overlap in at least one of the time-domain and a frequency-domain, where the second bandwidth corresponds to the larger bandwidth.

Aspect 9 is the apparatus of any of aspects 1 to 7, further including that the at least one processor is further configured to: determine a combined bandwidth including the first bandwidth and the paging bandwidth when the first bandwidth and the paging bandwidth are non-overlapping in the time-domain and non-overlapping in a frequency-domain, wherein the second bandwidth corresponds to the combined bandwidth.

Aspect 10 is the apparatus of any of aspects 1 to 9, further including that the at least one processor is further configured to: receive the paging CORESET via physical downlink control channel configuration information.

Aspect 11 is the apparatus of any of aspects 1 to 10, further including a transceiver coupled to the at least one processor.

Aspect 12 is a method of wireless communication for implementing any of aspects 1 to 11.

Aspect 13 is an apparatus for wireless communication including means for implementing any of aspects 1 to 11.

Aspect 14 is a non-transitory computer-readable storage medium storing computer executable code, where the code, when executed, causes a processor to implement any of aspects 1 to 11.

Aspect 15 is an apparatus for wireless communication at a base station including at least one processor coupled to a memory and configured to transmit, to a UE, an indication of an active BWP associated with an ON duration of a DRX cycle of the UE; and transmit a WUS to the UE on a first bandwidth at a WUS occasion of the DRX cycle, the first bandwidth corresponding to a subset of the active BWP.

Aspect 16 is the apparatus of aspect 15, further including that the at least one processor is further configured to: transmit a WUS CORESET defining the first bandwidth.

Aspect 17 is the apparatus of any of aspects 15 and 16, further including that the at least one processor is further configured to: transmit the WUS CORESET via physical downlink control channel configuration information.

Aspect 18 is the apparatus of any of aspects 15 to 17, further including that the at least one processor is further configured to: transmit the WUS CORESET while performing a connection establishment procedure or via a RRC reconfiguration message.

Aspect 19 is the apparatus of any of aspects 15 to 18, further including that the at least one processor is further configured to: transmit a paging configuration including at least a paging cycle, the paging cycle including one or more paging occasions; transmit a paging message at each of the one or more paging occasions including at least a first paging occasion; and transmit a second WUS at a second WUS occasion of the DRX cycle, the first paging occasion located near the second WUS occasion of the DRX cycle in a time-domain.

Aspect 20 is the apparatus of any of aspects 15 to 19, further including that the first paging occasion is located at an end of the paging cycle in the time-domain.

Aspect 21 is the apparatus of any of aspects 15 to 20, further including that the at least one processor is further configured to: transmit a paging CORESET defining a paging bandwidth corresponding to a second subset of the active BWP.

Aspect 22 is the apparatus of any of aspects 15 to 21, further including that the first bandwidth and the paging bandwidth at least partially overlap in at least one of the time-domain and a frequency-domain.

Aspect 23 is the apparatus of any of aspects 15 to 21, further including that the first bandwidth and the paging bandwidth are non-overlapping in the time-domain and non-overlapping in a frequency-domain.

Aspect 24 is the apparatus of any of aspects 15 to 23, further including that the at least one processor is further configured to: transmit the paging CORESET via physical downlink control channel configuration information.

Aspect 25 is the apparatus of any of aspects 15 to 24, further including a transceiver coupled to the at least one processor.

Aspect 26 is a method of wireless communication for implementing any of aspects 15 to 25.

Aspect 27 is an apparatus for wireless communication including means for implementing any of aspects 15 to 25.

Aspect 28 is a non-transitory computer-readable storage medium storing computer executable code, where the code, when executed, causes a processor to implement any of aspects 15 to 25.

What is claimed is:

1. An apparatus for wireless communication at a user equipment (UE), comprising:
a memory; and
at least one processor coupled to the memory and configured to:
receive an indication of an active bandwidth part (BWP) associated with an ON duration of a discontinuous reception (DRX) cycle;
monitor a first bandwidth for a wakeup signal (WUS) at a WUS occasion of the DRX cycle, the first bandwidth corresponding to a subset of the active BWP;
transition to an awake state for the ON duration when the WUS is received at the WUS occasion;
receive a paging configuration including at least a paging cycle, the paging cycle including one or more paging occasions;
determine a second bandwidth having:
a larger bandwidth between the first bandwidth and a paging bandwidth when the first bandwidth and the paging bandwidth at least partially overlap in at least one of a time-domain and a frequency-domain, or
a combined bandwidth including the first bandwidth and the paging bandwidth when the first bandwidth and the paging bandwidth are non-overlapping in the time-domain and non-overlapping in the frequency-domain; and
monitor the second bandwidth for a second WUS and a paging message at a paging occasion selected from the one or more paging occasions based on the paging cycle and the DRX cycle.

2. The apparatus of claim 1, wherein the at least one processor is further configured to:
receive a WUS control resource set (CORESET) defining the first bandwidth.

3. The apparatus of claim 2, wherein the at least one processor is further configured to:
receive the WUS CORESET via physical downlink control channel configuration information.

4. The apparatus of claim 2, wherein the at least one processor is further configured to:
receive the WUS CORESET while performing a connection establishment procedure or via a radio resource control (RRC) reconfiguration message.

5. The apparatus of claim 1, wherein the paging occasion is located near a second WUS occasion of the DRX cycle in the time-domain.

6. The apparatus of claim 1, wherein the paging occasion is located at an end of the paging cycle in the time-domain.

7. The apparatus of claim 1, wherein the at least one processor is further configured to:
receive a paging control resource set (CORESET) defining the paging bandwidth corresponding to a second subset of the active BWP.

8. The apparatus of claim 7, wherein the at least one processor is further configured to:
determine the larger bandwidth between the first bandwidth and the paging bandwidth when the first bandwidth and the paging bandwidth at least partially overlap in the at least one of the time-domain and the frequency-domain,
wherein the second bandwidth corresponds to the larger bandwidth.

9. The apparatus of claim 7, wherein the at least one processor is further configured to:
determine the combined bandwidth including the first bandwidth and the paging bandwidth when the first bandwidth and the paging bandwidth are non-overlapping in the time-domain and non-overlapping in the frequency-domain,
wherein the second bandwidth corresponds to the combined bandwidth.

10. The apparatus of claim 7, wherein the at least one processor is further configured to:
receive the paging CORESET via physical downlink control channel configuration information.

11. The apparatus of claim 1, further comprising a transceiver coupled to the at least one processor.

12. A method of wireless communication at a user equipment (UE), comprising:
receiving an indication of an active bandwidth part (BWP) associated with an ON duration of a discontinuous reception (DRX) cycle;
monitoring a first bandwidth for a wakeup signal (WUS) at a WUS occasion of the DRX cycle, the first bandwidth corresponding to a subset of the active BWP;
transitioning to an awake state for the ON duration when the WUS is received at the WUS occasion;
receiving a paging configuration including at least a paging cycle, the paging cycle including one or more paging occasions;
determining a second bandwidth having:
a larger bandwidth between the first bandwidth and a paging bandwidth when the first bandwidth and the paging bandwidth at least partially overlap in at least one of a time-domain and a frequency-domain, or
a combined bandwidth including the first bandwidth and the paging bandwidth when the first bandwidth and the paging bandwidth are non-overlapping in the time-domain and non-overlapping in the frequency-domain; and
monitoring the second bandwidth for a second WUS and a paging message at a paging occasion selected from the one or more paging occasions based on the paging cycle and the DRX cycle.

13. The method of claim 12, further comprising:
receiving a WUS control resource set (CORESET) defining the first bandwidth.

14. The method of claim 12, wherein the paging occasion is located near a second WUS occasion of the DRX cycle in the time-domain.

15. The method of claim 12, further comprising:
receiving a paging control resource set (CORESET) defining the paging bandwidth corresponding to a second subset of the active BWP.

16. An apparatus for wireless communication at a base station, comprising:
a memory; and
at least one processor coupled to the memory and configured to:
transmit, to a user equipment (UE), an indication of an active bandwidth part (BWP) associated with an ON duration of a discontinuous reception (DRX) cycle of the UE;
transmit a wakeup signal (WUS) to the UE on a first bandwidth at a WUS occasion of the DRX cycle, the first bandwidth corresponding to a subset of the active BWP;

transmit a paging configuration including at least a paging cycle, the paging cycle including one or more paging occasions;

transmit a paging message at each of the one or more paging occasions including at least a first paging occasion; and transmit a second WUS at a second WUS occasion of the DRX cycle based on a larger bandwidth of the first bandwidth and the paging bandwidth, wherein the first bandwidth and a paging bandwidth at least partially overlap in at least one of a time-domain and a frequency-domain, or transmit the second WUS at the second WUS occasion of the DRX cycle based on a combined bandwidth of the first bandwidth and the paging bandwidth, wherein the first bandwidth and the paging bandwidth are non-overlapping in the time-domain and non-overlapping in the frequency-domain.

17. The apparatus of claim 16, wherein the at least one processor is further configured to:

transmit a WUS control resource set (CORESET) defining the first bandwidth.

18. The apparatus of claim 17, wherein the at least one processor is further configured to:

transmit the WUS CORESET via physical downlink control channel configuration information.

19. The apparatus of claim 17, wherein the at least one processor is further configured to:

transmit the WUS CORESET while performing a connection establishment procedure or via a radio resource control (RRC) reconfiguration message.

20. The apparatus of claim 16, wherein the first paging occasion is located near the second WUS occasion of the DRX cycle in the time-domain.

21. The apparatus of claim 16, wherein the first paging occasion is located at an end of the paging cycle in the time-domain.

22. The apparatus of claim 16, wherein the at least one processor is further configured to:

transmit a paging control resource set (CORESET) defining the paging bandwidth corresponding to a second subset of the active BWP.

23. The apparatus of claim 16, wherein the first bandwidth and the paging bandwidth at least partially overlap in at least one of the time-domain and the frequency-domain.

24. The apparatus of claim 16, wherein the first bandwidth and the paging bandwidth are non-overlapping in the time-domain and non-overlapping in the frequency-domain.

25. The apparatus of claim 22, wherein the at least one processor is further configured to:

transmit the paging CORESET via physical downlink control channel configuration information.

26. The apparatus of claim 16, further comprising a transceiver coupled to the at least one processor.

27. A method of wireless communication at a base station, comprising:

transmitting, to a user equipment (UE), an indication of an active bandwidth part (BWP) associated with an ON duration of a discontinuous reception (DRX) cycle of the UE;

transmitting a wakeup signal (WUS) to the UE on a first bandwidth at a WUS occasion of the DRX cycle, the first bandwidth corresponding to a subset of the active BWP;

transmitting a paging configuration including at least a paging cycle, the paging cycle including one or more paging occasions;

transmitting a paging message at each of the one or more paging occasions including at least a first paging occasion; and transmitting a second WUS at a second WUS occasion of the DRX cycle based on a larger bandwidth of the first bandwidth and the paging bandwidth, wherein the first bandwidth and a paging bandwidth at least partially overlap in at least one of a time-domain and a frequency-domain, or transmitting the second WUS at the second WUS occasion of the DRX cycle based on a combined bandwidth of the first bandwidth and the paging bandwidth wherein the first bandwidth and the paging bandwidth are non-overlapping in the time-domain and non-overlapping in the frequency-domain.

28. The method of claim 27, further comprising:

transmitting a WUS control resource set (CORESET) defining the first bandwidth.

29. The method of claim 27, wherein the first paging occasion is located near the second WUS occasion of the DRX cycle in the time-domain.

30. The method of claim 27, further comprising:

transmitting a paging control resource set (CORESET) defining the paging bandwidth corresponding to a second subset of the active BWP.

\* \* \* \* \*